(12) United States Patent
Kuo

(10) Patent No.: US 11,659,605 B2
(45) Date of Patent: May 23, 2023

(54) METHOD AND APPARATUS FOR RELAY UE SIDELINK RLC BEARER CONFIGURATION TO SUPPORT UE-TO-NETWORK RELAYING IN A WIRELESS COMMUNICATION SYSTEM

(71) Applicant: ASUSTek Computer Inc., Taipei (TW)

(72) Inventor: Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/948,574

(22) Filed: Sep. 20, 2022

(65) Prior Publication Data

US 2023/0129740 A1 Apr. 27, 2023

Related U.S. Application Data

(60) Provisional application No. 63/271,440, filed on Oct. 25, 2021.

(51) Int. Cl.
*H04W 76/10* (2018.01)
*H04W 76/27* (2018.01)
*H04W 88/04* (2009.01)

(52) U.S. Cl.
CPC .......... *H04W 76/10* (2018.02); *H04W 76/27* (2018.02); *H04W 88/04* (2013.01)

(58) Field of Classification Search
CPC ...... H04W 76/10; H04W 76/27; H04W 88/04
See application file for complete search history.

(56) References Cited

U.S. PATENT DOCUMENTS 11,516,878 B2 * 11/2022 Pan .......................... H04W 4/40

OTHER PUBLICATIONS

MediaTek Inc., "Introduction of Rel-17 Sidelink Relay", 3GPP TSG-RAN WG2 Meeting #116 Electronic Online Meeting, Nov. 1-12, 2021, R2-210wxyz, pp. 1-38.
MediaTek Inc., "[AT111-e][605][Relay] L2 Relay Mechanism (MediaTek)", Agenda Item 8.7.3, Document for Discussion and decision, 3GPP TSG-RAN WG Meeting #111 electronic Online, Aug. 17-28, 2020, R2-20nnnnn.

\* cited by examiner

*Primary Examiner* — Diane D Mizrahi
(74) *Attorney, Agent, or Firm* — Blue Capital Law Firm, P.C.

(57) ABSTRACT

A method and device are disclosed from the perspective of a first User Equipment (UE). In one embodiment, the first UE receives a Radio Resource Control (RRC) message from a network node, wherein the RRC message includes a first sidelink RLC bearer configuration and wherein the first sidelink Radio Link Control (RLC) bearer configuration includes a first index identifying the first sidelink RLC bearer configuration and a first sidelink RLC configuration. The first UE also transmits a first PC5 RRC message to a second UE, wherein the first PC5 RRC message includes the first sidelink RLC bearer configuration. Furthermore, the first UE receives a second PC5 RRC message from the second UE, wherein the second PC5 RRC message includes a second sidelink RLC bearer configuration and wherein the second sidelink RLC bearer configuration includes a second index identifying the second sidelink RLC bearer configuration and a second sidelink RLC configuration.

20 Claims, 14 Drawing Sheets

US 11,659,605 B2

METHOD AND APPARATUS FOR RELAY UE SIDELINK RLC BEARER CONFIGURATION TO SUPPORT UE-TO-NETWORK RELAYING IN A WIRELESS COMMUNICATION SYSTEM

CROSS-REFERENCE TO RELATED APPLICATIONS

The present Application claims the benefit of U.S. Provisional Patent Application Ser. No. 63/271,440 filed on Oct. 25, 2021, the entire disclosure of which is incorporated herein in its entirety by reference.

FIELD

This disclosure generally relates to wireless communication networks, and more particularly, to a method and apparatus for relay UE sidelink RLC bearer configuration to support UE-to-Network relaying in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed from the perspective of a first User Equipment (UE). In one embodiment, the method includes the first UE receiving a Radio Resource Control (RRC) message from a network node, wherein the RRC message includes a first sidelink RLC bearer configuration and wherein the first sidelink Radio Link Control (RLC) bearer configuration includes a first index identifying the first sidelink RLC bearer configuration and a first sidelink RLC configuration. The method also includes the first UE transmitting a first PC5 RRC message to a second UE, wherein the first PC5 RRC message includes the first sidelink RLC bearer configuration. The method further includes the first UE receiving a second PC5 RRC message from the second UE, wherein the second PC5 RRC message includes a second sidelink RLC bearer configuration and wherein the second sidelink RLC bearer configuration includes a second index identifying the second sidelink RLC bearer configuration and a second sidelink RLC configuration. In addition, the method incudes the first UE associating the first sidelink RLC configuration with the second sidelink RLC configuration to form RLC parameters of a RLC entity if the first index is equal to the second index.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 38.331 v16.6.0, "NR; Radio Resource Control (RRC) protocol specification (Release 16)"; R2-2108924, "Introduction of Rel-17 Sidelink Relay", MediaTek Inc.; and 3GPP Draft_38.331 Running CR for SL relay_v13_rapp, "Introduction of Rel-17 Sidelink Relay". The standards and documents listed above are hereby expressly incorporated by reference in their entirety.

Figure 1:
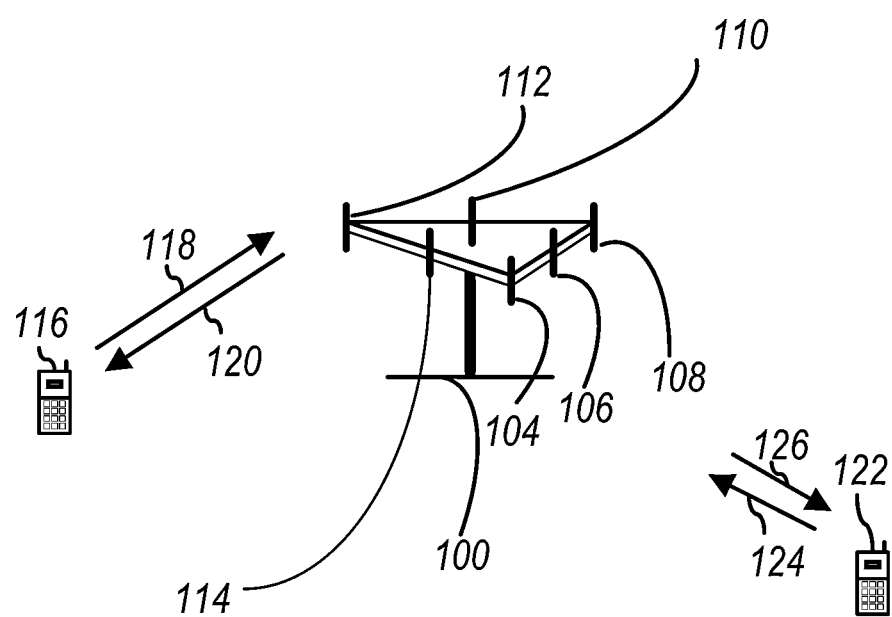
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
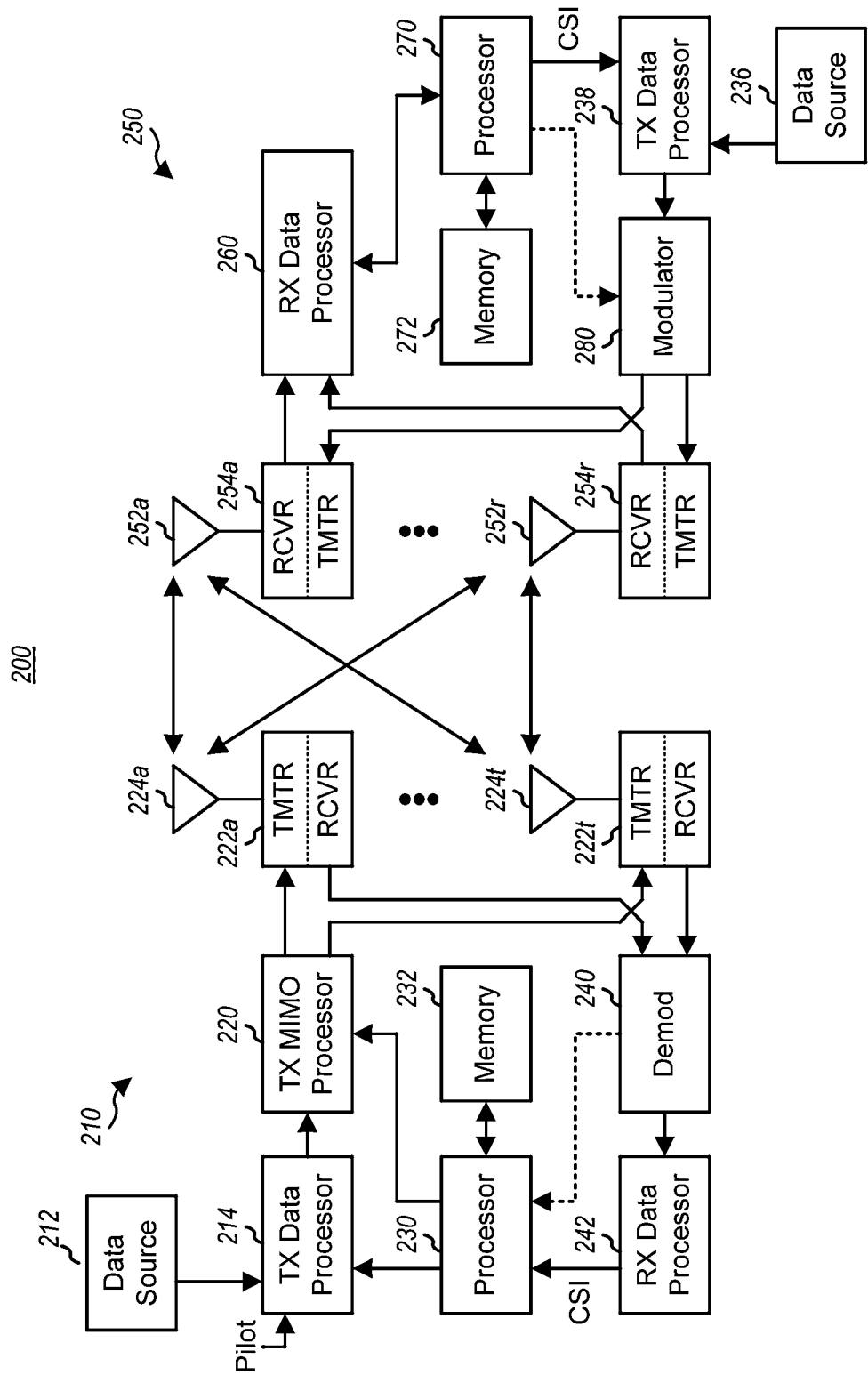
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
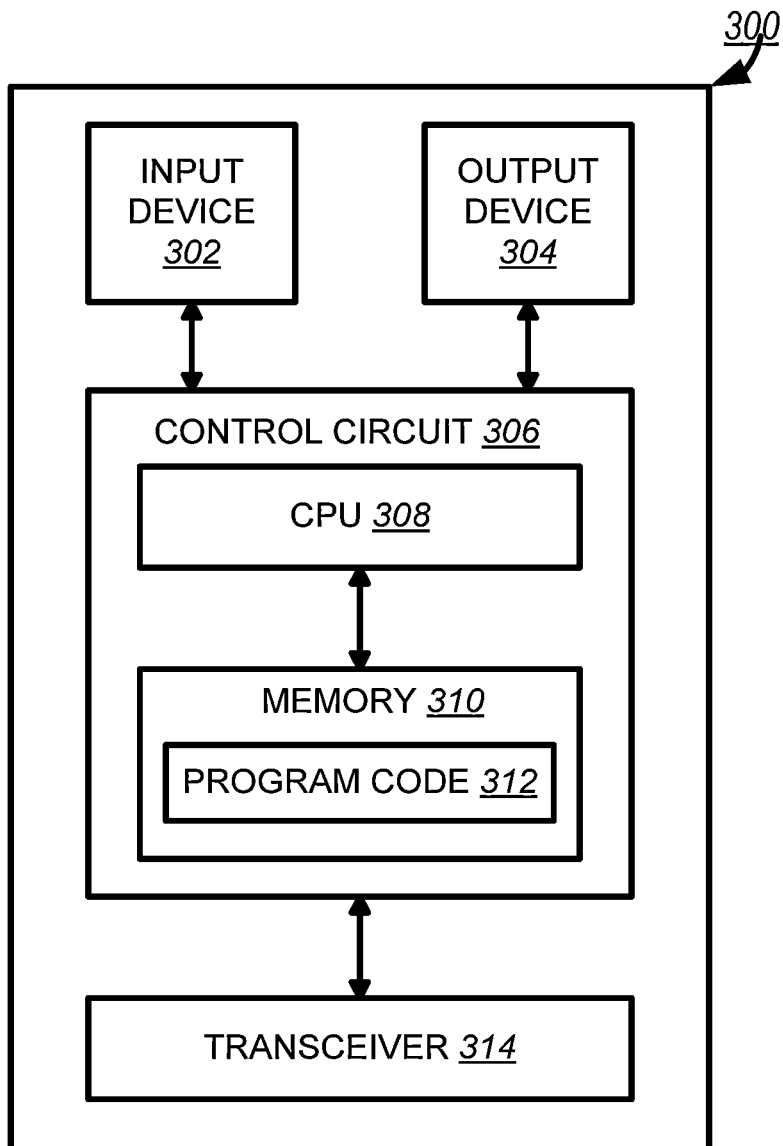
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
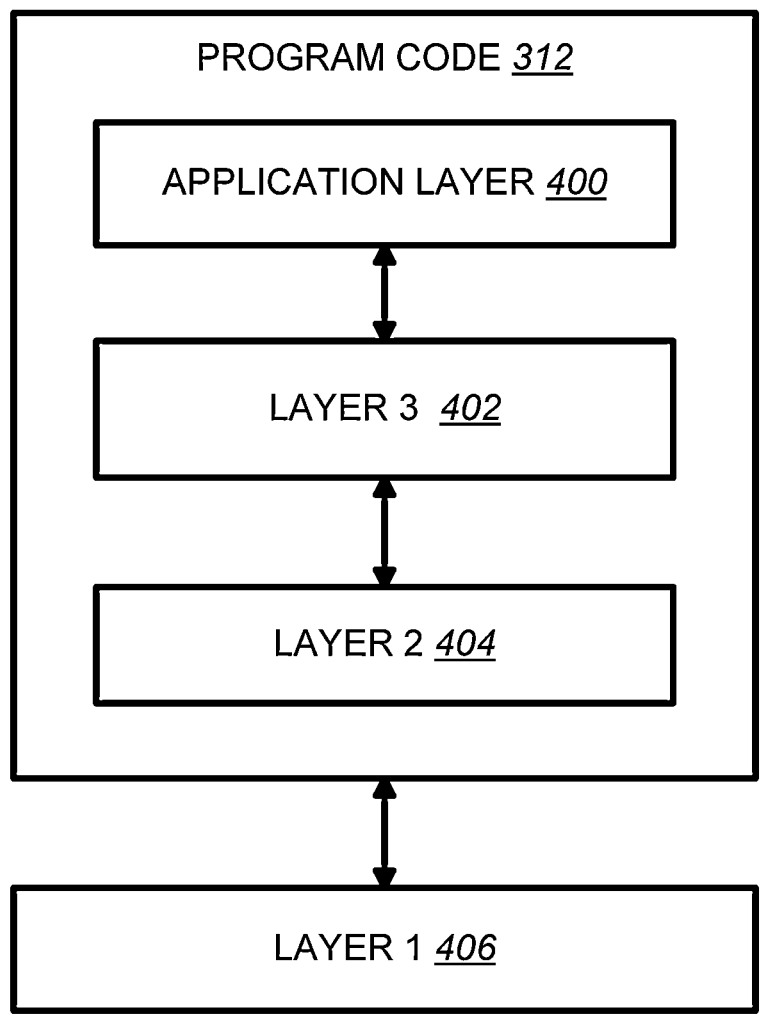
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 38.331 specifies sidelink procedures for Rel-16 Vehicle-to-Everything (V2X) services as follows:

5.8.3 Sidelink UE Information for NR Sidelink Communication 5.8.3.1 General

Figure 5:
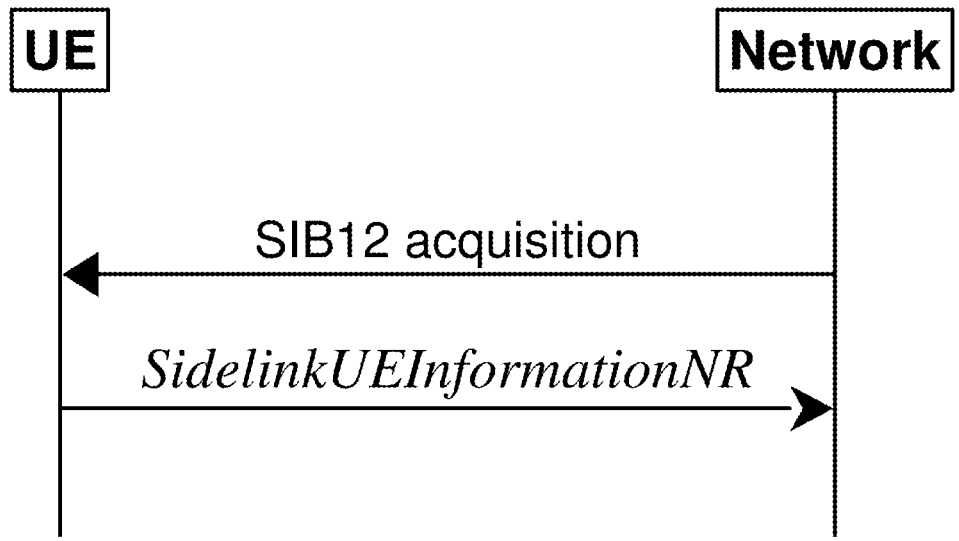
FIG. 5 is a reproduction of FIG. 5.8.3.1-1 of 3GPP TS 38.331 V16.6.0.

FIG. 5.8.3.1-1 of 3GPP TS 38.331 V16.6.0, entitled "Sidelink UE information for NR sidelink communication", is reproduced as FIG. 5

The purpose of this procedure is to inform the network that the UE:
  is interested or no longer interested to receive or transmit NR sidelink communication,
  is requesting assignment or release of transmission resource for NR sidelink communication,
  is reporting QoS parameters and QoS profile(s) related to NR sidelink communication,
  is reporting that a sidelink radio link failure or sidelink RRC reconfiguration failure has been detected,
  is reporting the sidelink UE capability information of the associated peer UE for unicast communication,
  is reporting the RLC mode information of the sidelink data radio bearer(s) received from the associated peer UE for unicast communication.

5.8.3.2 Initiation

A UE capable of NR sidelink communication that is in RRC_CONNECTED may initiate the procedure to indicate it is (interested in) receiving or transmitting NR sidelink communication in several cases including upon successful connection establishment or resuming, upon change of interest, upon changing QoS profiles, upon receiving UECapabilityInformationSidelink from the associated peer UE, upon RLC mode information updated from the associated peer UE or upon change to a PCell providing SIB12 including sl-ConfigCommonNR. A UE capable of NR sidelink communication may initiate the procedure to request assignment of dedicated sidelink DRB configuration and transmission resources for NR sidelink communication transmission. A UE capable of NR sidelink communication may initiate the procedure to report to the network that a sidelink radio link failure or sidelink RRC reconfiguration failure has been declared.

```
Upon initiating this procedure, the UE shall:
    1> if SIB12 including sl-ConfigCommonNR is provided by the PCell:
        2> ensure having a valid version of SIB12 for the PCell;
        2> if configured by upper layers to receive NR sidelink communication on the frequency
            included in sl-FreqInfoList in SIB12 of the PCell:
            3> if the UE did not transmit a SidelinkUEInformationNR message since last entering
                RRC_CONNECTED state; or
            3> if since the last time the UE transmitted a SidelinkUEInformationNR message the UE
                connected to a PCell not providing SIB12 including sl-ConfigCommonNR; or
            3> if the last transmission of the SidelinkUEInformationNR message did not include sl-
                RxInterestedFreqList; or if the frequency configured by upper layers to receive NR
                sidelink communication on has changed since the last transmission of the
                SidelinkUEInformationNR message:
                4> initiate transmission of the SidelinkUEInformationNR message to indicate the NR
                    sidelink communication reception frequency of interest in accordance with
                    5.8.3.3;
        2> else:
            3> if the last transmission of the SidelinkUEInformationNR message included sl-
                RxInterestedFreqList:
                4> initiate transmission of the SidelinkUEInformationNR message to indicate it is no
                    longer interested in NR sidelink communication reception in accordance with
                    5.8.3.3;
        2> if configured by upper layers to transmit NR sidelink communication on the frequency
            included in sl-FreqInfoList in SIB12 of the PCell:
            3> if the UE did not transmit a SidelinkUEInformationNR message since last entering
                RRC_CONNECTED state; or
            3> if since the last time the UE transmitted a SidelinkUEInformationNR message the UE
                connected to a PCell not providing SIB12 including sl-ConfigCommonNR; or
            3> if the last transmission of the SidelinkUEInformationNR message did not include sl-
                TxResourceReqList; or if the information carried by the sl-TxResourceReqList has
                changed since the last transmission of the SidelinkUEInformationNR message:
                4> initiate transmission of the SidelinkUEInformationNR message to indicate the NR
                    sidelink communication transmission resources required by the UE in accordance
                    with 5.8.3.3;
        2> else:
            3> if the last transmission of the SidelinkUEInformationNR message included sl-
                TxResourceReqList:
                4> initiate transmission of the SidelinkUEInformationNR message to indicate it no
                    longer requires NR sidelink communication transmission resources in accordance
                    with 5.8.3.3.
```

5.8.3.3 Actions Related to Transmission of SidelinkUEInformationNR Message

---

The UE shall set the contents of the SidelinkUEInformationNR message as
follows:
  1> if the UE initiates the procedure to indicate it is (no more) interested
      to receive NR sidelink communication or to request (configuration/
      release) of NR sidelink communication transmission resources or
      to report to the network that a sidelink radio link failure or sidelink
      RRC reconfiguration failure has been declared (i.e. UE includes
      all concerned information, irrespective of what triggered the
      procedure):
    2> if SIB12 including sl-ConfigCommonNR is provided by the
        PCell:
      3> if configured by upper layers to receive NR sidelink
          communication:
        4> include sl-RxInterestedFreqList and set it to the frequency
            for NR sidelink communication reception;
      3> if configured by upper layers to transmit NR sidelink
          communication:
        4> include sl-TxResourceReqList and set its fields (if needed)
            as follows for each destination for which it requests network
            to assign NR sidelink communication resource:
          5> set sl-DestinationIdentity to the destination identity
              configured by upper layer for NR sidelink
              communication transmission;
          5> set sl-CastType to the cast type of the associated
              destination identity configured by the upper layer
              for the NR sidelink communication transmission;
          5> set sl-RLC-ModeIndication to include the RLC mode(s)
              and optionally QoS profile(s) of the sidelink QoS flow(s)
              of the associated RLC mode(s), if the associated
              bi-directional sidelink DRB has been established due to
              the configuration by RRCReconfigurationSidelink;
          5> set sl-QoS-InfoList to include QoS profile(s) of the
              sidelink QoS flow(s) of the associated destination
              configured by the upper layer for the NR sidelink
              communication transmission;
          5> set sl-InterestedFreqList to indicate the frequency of the
              associated destination for NR sidelink communication
              transmission;
          5> set sl-TypeTxSyncList to the current synchronization
              reference type used on the associated
              sl-InterestedFreqList for NR sidelink
              communication transmission.
          5> set sl-CapabilityInformationSidelink to include
              UECapabilityInformationSidelink message,
              if any, received from peer UE.
      4> if a sidelink radio link failure or a sidelink RRC
          reconfiguration failure has been declared, according to
          clauses 5.8.9.3 and 5.8.9.1.8, respectively;
        5> include sl-FailureList and set its fields as follows for
            each destination for which it reports the NR sidelink
            communication failure:
          6> set sl-DestinationIdentity to the destination identity
              configured by upper layer for NR sidelink
              communication transmission;
          6> if the sidelink RLF is detected as specified in
              sub-clause 5.8.9.3:
            7> set sl-Failure as rlf for the associated
                destination for the NR sidelink
                communication transmission;
          6> else if RRCReconfigurationFailureSidelink
              is received:
            7> set sl-Failure as configFailure for the
                associated destination for the NR sidelink
                communication transmission;
  1> if the UE initiates the procedure while connected to an
      E-UTRA PCell:
    2> submit the SidelinkUEInformationNR to lower layers via
        SRB1, embedded in E-UTRA RRC message
        ULInformationTransferIRAT as specified in TS 36.331 [10],
        clause 5.6.28;
  1> else:
    2> submit the SidelinkUEInformationNR message to lower layers
        for transmission.
[ . . . ]

Figure 6:
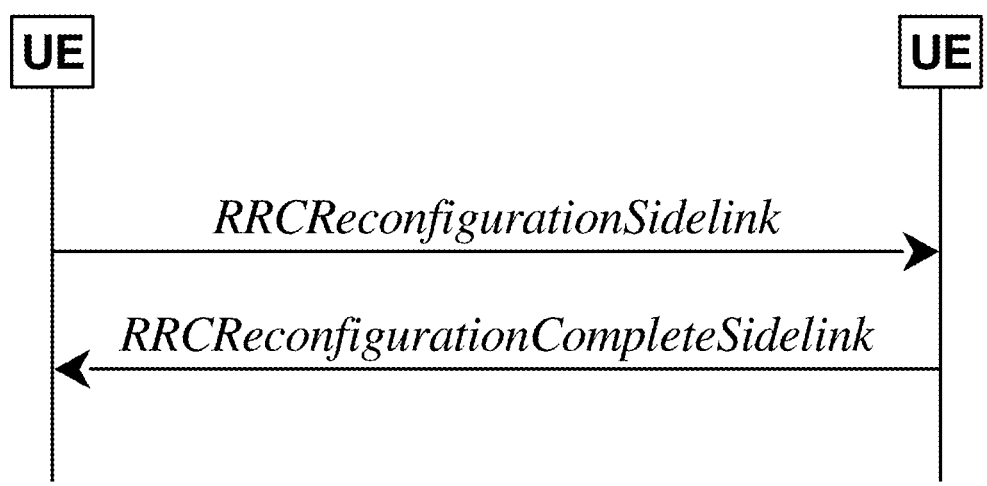
FIG. 6 is a reproduction of FIG. 5.8.9.1.1-1 of 3GPP TS 38.331 V16.6.0.
Figure 7:
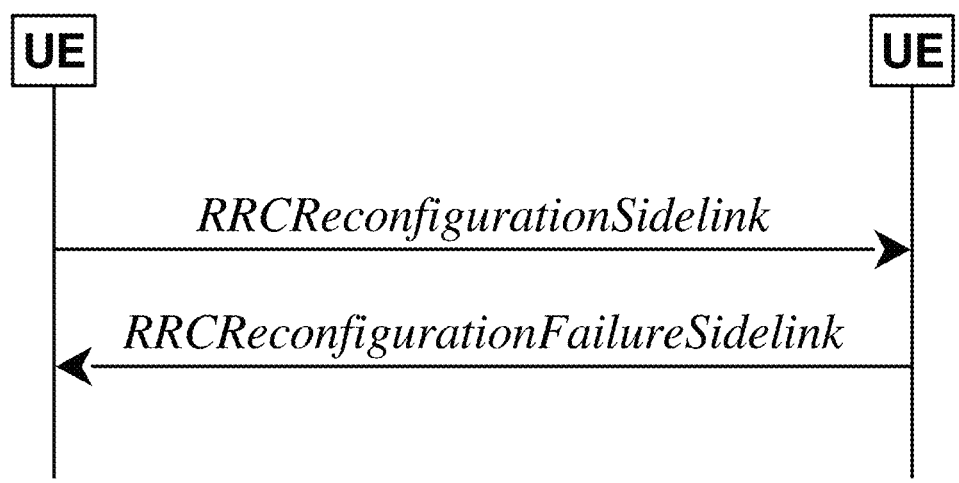
FIG. 7 is a reproduction of FIG. 5.8.9.1.1-2 of 3GPP TS 38.331 V16.6.0.

5.8.9 Sidelink RRC Procedure
5.8.9.1 Sidelink RRC Reconfiguration
5.8.9.1.1 General
  [FIG. 5.8.9.1.1-1 of 3GPP TS 38.331 V16.6.0, entitled
   "Sidelink RRC reconfiguration, successful", is reproduced as FIG. 6]
  [FIG. 5.8.9.1.1-2 of 3GPP TS 38.331 V16.6.0, entitled
   "Sidelink RRC reconfiguration, failure", is reproduced as FIG. 7]
  The purpose of this procedure is to modify a PC5-RRC
  connection, e.g. to establish/modify/release sidelink DRBs,
  to (re-)configure NR sidelink measurement and reporting, to
  (re-)configure sidelink CSI reference signal resources and
  CSI reporting latency bound.
  The UE may initiate the sidelink RRC reconfiguration
  procedure and perform the operation in sub-clause 5.8.9.1.2
  on the corresponding PC5-RRC connection in following
  cases:
    the release of sidelink DRBs associated with the peer UE,
      as specified in sub-clause 5.8.9.1a.1;
    the establishment of sidelink DRBs associated with the
      peer UE, as specified in sub-clause 5.8.9.1a.2;
    the modification for the parameters included in SLRB-
      Config of sidelink DRBs associated with the peer UE,
      as specified in sub-clause 5.8.9.1a.2;
    the (re-)configuration of the peer UE to perform NR
      sidelink measurement and report.
    the (re-)configuration of the sidelink CSI reference signal
      resources and CSI reporting latency bound.
  In RRC_CONNECTED, the UE applies the NR sidelink
  communications parameters provided in RRCReconfiguration (if any). In RRC_IDLE or RRC_INACTIVE, the UE
  applies the NR sidelink communications parameters provided in system information (if any). For other cases, UEs
  apply the NR sidelink communications parameters provided
  in SidelinkPreconfigNR (if any). When UE performs state
  transition between above three cases, the UE applies the NR
  sidelink communications parameters provided in the new
  state, after acquisition of the new configurations. Before
  acquisition of the new configurations, UE continues applying the NR sidelink communications parameters provided in
  the old state.
  5.8.9.1.2 Actions Related to Transmission of RRCReconfigurationSidelink Message

---

The UE shall set the contents of RRCReconfigurationSidelink message
as follows:
  1> for each sidelink DRB that is to be released, according to sub-clause
      5.8.9.1a.1.1, due to configuration by sl-ConfigDedicatedNR, SIB12,
      SidelinkPreconfigNR or by upper layers:
    2> set the SLRB-PC5-ConfigIndex included in the
        slrb-ConfigToReleaseList corresponding to the sidelink DRB;
  1> for each sidelink DRB that is to be established or modified,
      according to sub-clause 5.8.9.1a.2.1, due to receiving
      sl-ConfigDedicatedNR, SIB12 or SidelinkPreconfigNR:
    2> set the SLRB-Config included in the slrb-ConfigToAddModList,
        according to the received sl-RadioBearerConfig and sl-RLC-
        BearerConfig corresponding to the sidelink DRB;
  1> set the sl-MeasConfig as follows:
    2> If the frequency used for NR sidelink communication is
        included in sl-FreqInfoToAddModList in
        sl-ConfigDedicatedNR within RRCReconfiguration
        message or included in sl-ConfigCommonNR within SIB12:
      3> if UE is in RRC_CONNECTED:
        4> set the sl-MeasConfig according to stored NR sidelink
            measurement configuration information for this
            destination;
      3> if UE is in RRC_IDLE or RRC_INACTIVE:
        4> set the sl-MeasConfig according to stored NR sidelink
            measurement configuration received from SIB12;

2> else:
    3> set the sl-MeasConfig according to the sl-MeasPreconfig in SidelinkPreconfigNR;
 1> start timer T400 for the destination associated with the sidelink DRB;
 1> set the sl-CSI-RS-Config;
 1> set the sl-LatencyBoundCSI-Report, NOTE 1:
How to set the parameters included in sl-CSI-RS-Config and sl-LatencyBoundCSI-Report is up to UE implementation.

The UE shall submit the RRCReconfigurationSidelink message to lower layers for transmission.

5.8.9.1.3 Reception of an RRCReconfigurationSidelink by the UE

The UE shall perform the following actions upon reception of the RRCReconfigurationSidelink:
 1> if the RRCReconfigurationSidelink includes the sl-ResetConfig:
  2> perform the sidelink reset configuration procedure as specified in 5.8.9.1.10;
 1> if the RRCReconfigurationSidelink includes the slrb-ConfigToReleaseList:
  2> for each SLRB-PC5-ConfigIndex value included in the slrb-ConfigToReleaseList that is part of the current UE sidelink configuration:
   3> perform the sidelink DRB release procedure, according to sub-clause 5.8.9.1a.1;
 1> if the RRCReconfigurationSidelink includes the slrb-ConfigToAddModList:
  2> for each slrb-PC5-ConfigIndex value included in the slrb-ConfigToAddModList that is not part of the current UE sidelink configuration:
   3> if sl-MappedQoS-FlowsToAddList is included:
    4> apply the SL-PQFI included in sl-MappedQoS-FlowsToAddList;
   3> perform the sidelink DRB addition procedure, according to sub-clause 5.8.9.1a.2;
  2> for each slrb-PC5-ConfigIndex value included in the slrb-ConfigToAddModList that is part of the current UE sidelink configuration:
   3> if sl-MappedQoS-FlowsToAddList is included:
    4> add the SL-PQFI included in sl-MappedQoS-FlowsToAddList to the corresponding sidelink DRB;
   3> if sl-MappedQoS-FlowsToReleaseList is included:
    4> remove the SL-PQFI included in sl-MappedQoS-FlowsToReleaseList from the corresponding sidelink DRB;
   3> if the sidelink DRB release conditions as described in sub-clause 5.8.9.1a.1.1 are met:
    4> perform the sidelink DRB release procedure according to sub-clause 5.8.9.1a.1.2;
   3> else if the sidelink DRB modification conditions as described in sub-clause 5.8.9.1a.2.1 are met:
    4> perform the sidelink DRB modification procedure according to sub-clause 5.8.9.1a.2.2;
 1> if the RRCReconfigurationSidelink message includes the sl-MeasConfig:
  2> perform the sidelink measurement configuration procedure as specified in 5.8.10;
 1> if the RRCReconfigurationSidelink message includes the sl-CSI-RS-Config:
  2> apply the sidelink CSI-RS configuration;
 1> if the RRCReconfigurationSidelink message includes the sl-LatencyBoundCSI-Report:
  2> apply the configured sidelink CSI report latency bound;
 1> if the UE is unable to comply with (part of) the configuration included in the RRCReconfigurationSidelink (i.e. sidelink RRC reconfiguration failure):
  2> continue using the configuration used prior to the reception of the RRCReconfigurationSidelink message;
  2> set the content of the RRCReconfigurationFailureSidelink message;
   3> submit the RRCReconfigurationFailureSidelink message to lower layers for transmission;
 1> else:
  2> set the content of the RRCReconfigurationCompleteSidelink message;
   3> submit the RRCReconfigurationCompleteSidelink message to lower layers for transmission;

NOTE 1:
When the same logical channel is configured with different RLC mode by another UE, the UE handles the case as sidelink RRC reconfiguration failure.

5.8.9.1.4 Void
5.8.9.1.5 Void
5.8.9.1.6 Void
5.8.9.1.7 Void
5.8.9.1.8 Reception of an RRCReconfigurationFailureSidelink by the UE The UE shall perform the following actions upon reception of the RRCReconfigurationFailureSidelink:
 1> stop timer T400 for the destination, if running;
 1> continue using the configuration used prior to corresponding RRCReconfigurationSidelink message;
 1> if UE is in RRC_CONNECTED:
  2> perform the sidelink UE information for NR sidelink communication procedure, as specified in 5.8.3.3 or sub-clause 5.10.15 in TS 36.331 [10];

5.8.9.1.9 Reception of an RRCReconfigurationCompleteSidelink by the UE

The UE shall perform the following actions upon reception of the RRCReconfigurationCompleteSidelink:
 1> stop timer T400 for the destination, if running;
 1> consider the configurations in the corresponding RRCReconfigurationSidelink message to be applied.

5.8.9.1.10 Sidelink Reset Configuration

The UE shall:
 1> release/clear current sidelink radio configuration of this destination received in the RRCReconfigurationSidelink;
 1> release the sidelink DRBs of this destination, in according to sub-clause 5.8.9.1a.1;
 1> reset the sidelink specific MAC of this destination.

NOTE 1: Sidelink radio configuration is not just the resource configuration but may include other configurations included in the RRCReconfigurationSidelink message except the sidelink DRBs of this destination.

NOTE 2: After the sidelink DRB release procedure, UE may perform the sidelink DRB addition according to the current sidelink configuration of this destination, received in sl-ConfigDedicatedNR, SIB12 and SidelinkPreconfigNR, according to sub-clause 5.8.9.1a.2.

5.8.9.1a Sidelink Radio Bearer Management
5.8.9.1a.1 Sidelink DRB Release
5.8.9.1a.1.1 Sidelink DRB Release Conditions For NR sidelink communication, a sidelink DRB release is initiated in the following cases:
 1> for groupcast, broadcast and unicast, if slrb-Uu-ConfigIndex (if any) of the sidelink DRB is included in sl-RadioBearerToReleaseList in sl-ConfigDedicatedNR; or
 1> for groupcast and broadcast, if no sidelink QoS flow with data indicated by upper layers is mapped to the sidelink DRB for transmission, which is (re)configured by receiving SIB12 or SidelinkPreconfigNR; or
 1> for groupcast, broadcast and unicast, if SL-RLC-BearerConfigIndex (if any) of the sidelink DRB is included in sl-RLC-BearerToReleaseList in sl-ConfigDedicatedNR; or 1> for unicast, if no sidelink QoS flow with data indicated by upper layers is mapped to the sidelink DRB for transmission, which is (re)configured by receiving SIB12 or SidelinkPreconfigNR, and if no sidelink QoS flow mapped to the sidelink DRB, which is (re)configured by receiving RRCReconfigurationSidelink, has data; or 1> for unicast, if SLRB-PC5-ConfigIndex (if any) of the sidelink DRB is included in slrb-ConfigToReleaseList in RRCReconfigurationSidelink or if sl-ResetConfig is included in RRCReconfigurationSidelink; or 1> for unicast, when the corresponding PC5-RRC connection is released due to sidelink RLF being detected, according to clause 5.8.9.3; or 1> for unicast, when the corresponding PC5-RRC connection is released due to upper layer request according to clause 5.8.9.5.

5.8.9.1a.1.2 Sidelink DRB Release Operations

For each sidelink DRB, whose sidelink DRB release conditions are met as in sub-clause 5.8.9.1a.1.1, the UE capable of NR sidelink communication that is configured by upper layers to perform NR sidelink communication shall:

1> for groupcast and broadcast; or

1> for unicast, if the sidelink DRB release was triggered after the reception of the RRCReconfigurationSidelink message; or 1> for unicast, after receiving the RRCReconfigurationCompleteSidelink message, if the sidelink DRB release was triggered due to the configuration received within the sl-ConfigDedicatedNR, SIB12, SidelinkPreconfigNR or indicated by upper layers:

2> release the PDCP entity for NR sidelink communication associated with the sidelink DRB;

2> if SDAP entity for NR sidelink communication associated with this sidelink DRB is configured:

3> indicate the release of the sidelink DRB to the SDAP entity associated with this sidelink DRB (TS 37.324 [24], clause 5.3.3);

2> release SDAP entities for NR sidelink communication, if any, that have no associated sidelink DRB as specified in TS 37.324 [24] clause 5.1.2;

1> for groupcast and broadcast; or

1> for unicast, after receiving the RRCReconfigurationCompleteSidelink message, if the sidelink DRB release was triggered due to the configuration received within the sl-ConfigDedicatedNR:

2> for each sl-RLC-BearerConfigIndex included in the received sl-RLC-BearerToReleaseList that is part of the current UE sidelink configuration:

3> release the RLC entity and the corresponding logical channel for NR sidelink communication, associated with the sl-RLC-BearerConfigIndex.

1> for unicast, if the sidelink DRB release was triggered due to the reception of the RRCReconfigurationSidelink message; or 1> for unicast, after receiving the RRCReconfigurationCompleteSidelink message, if the sidelink DRB release was triggered due to the configuration received within the SIB12, SidelinkPreconfigNR or indicated by upper layers:

2> release the RLC entity and the corresponding logical channel for NR sidelink communication associated with the sidelink DRB;

2> perform the sidelink UE information procedure in sub-clause 5.8.3 for unicast if needed.

1> if the sidelink radio link failure is detected for a specific destination:

2> release the PDCP entity, RLC entity and the logical channel of the sidelink DRB for the specific destination.

5.8.9.1a.2 Sidelink DRB Addition/Modification 5.8.9.1a.2.1 Sidelink DRB Addition/Modification Conditions For NR sidelink communication, a sidelink DRB addition is initiated only in the following cases:

1> if any sidelink QoS flow is (re)configured by sl-ConfigDedicatedNR, SIB12, SidelinkPreconfigNR and is to be mapped to one sidelink DRB, which is not established; or 1> if any sidelink QoS flow is (re)configured by RRCReconfigurationSidelink and is to be mapped to a sidelink DRB, which is not established;

For NR sidelink communication, a sidelink DRB modification is initiated only in the following cases:

1> if any of the sidelink DRB related parameters is changed by sl-ConfigDedicatedNR, SIB12, SidelinkPreconfigNR or RRCReconfigurationSidelink for one sidelink DRB, which is established;

5.8.9.1a.2.2 Sidelink DRB Addition/Modification Operations

For the sidelink DRB, whose sidelink DRB addition conditions are met as in sub-clause 5.8.9.1a.2.1, the UE capable of NR sidelink communication that is configured by upper layers to perform NR sidelink communication shall:

1> for groupcast and broadcast; or

1> for unicast, if the sidelink DRB addition was triggered due to the reception of the RRCReconfigurationSidelink message; or 1> for unicast, after receiving the RRCReconfigurationCompleteSidelink message, if the sidelink DRB addition was triggered due to the configuration received within the sl-ConfigDedicatedNR, SIB12, SidelinkPreconfigNR or indicated by upper layers:

2> if an SDAP entity for NR sidelink communication associated with the destination and the cast type of the sidelink DRB does not exist:

3> establish an SDAP entity for NR sidelink communication as specified in TS 37.324 [24] clause 5.1.1;

2> (re)configure the SDAP entity in accordance with the sl-SDAP-ConfigPC5 received in the RRCReconfigurationSidelink or sl-SDAP-Config received in sl-ConfigDedicatedNR, SIB12, SidelinkPreconfigNR, associated with the sidelink DRB;

2> establish a PDCP entity for NR sidelink communication and configure it in accordance with the sl-PDCP-ConfigPC5 received in the RRCReconfigurationSidelink or sl-PDCP-Config received in sl-ConfigDedicatedNR, SIB12, SidelinkPreconfigNR, associated with the sidelink DRB;

2> establish a RLC entity for NR sidelink communication and configure it in accordance with the sl-RLC-ConfigPC5 received in the RRCReconfigurationSidelink or sl-RLC-Config received in sl-ConfigDedicatedNR, SIB12, SidelinkPreconfigNR, associated with sidelink DRB;

2> if this procedure was due to the reception of a RRCReconfigurationSidelink message:

3> configure the MAC entity with a logical channel in accordance with the sl-MAC-LogicalChannelConfigPC5 received in the RRCReconfigurationSidelink associated with the sidelink DRB, and perform the sidelink UE information procedure in sub-clause 5.8.3 for unicast if need;

2> else:
   3> configure the MAC entity with a logical channel associated with the sidelink DRB, by assigning a new logical channel identity, in accordance with the sl-MAC-LogicalChannelConfig received in the sl-ConfigDedicatedNR, SIB12, SidelinkPreconfigNR.

NOTE 1: When a sidelink DRB addition is due to the configuration by RRCReconfigurationSidelink, it is up to UE implementation to select the sidelink DRB configuration as necessary transmitting parameters for the sidelink DRB, from the received sl-ConfigDedicatedNR (if in RRC_CONNECTED), SIB12 (if in RRC_IDLE/INACTIVE), SidelinkPreconfigNR (if out of coverage) with the same RLC mode as the one configured in RRCReconfigurationSidelink.

For the sidelink DRB, whose sidelink DRB modification conditions are met as in sub-clause 5.8.9.1a.2.1, the UE capable of NR sidelink communication that is configured by upper layers to perform NR sidelink communication shall:

1> for groupcast and broadcast; or
1> for unicast, if the sidelink DRB modification was triggered due to the reception of the RRCReconfigurationSidelink message; or
1> for unicast, after receiving the RRCReconfigurationCompleteSidelink message, if the sidelink DRB modification was triggered due to the configuration received within the sl-ConfigDedicatedNR, SIB12 or SidelinkPreconfigNR:
   2> reconfigure the SDAP entity of the sidelink DRB, in accordance with the sl-SDAP-ConfigPC5 received in the RRCReconfigurationSidelink or sl-SDAP-Config received in sl-ConfigDedicatedNR, SIB12, SidelinkPreconfigNR, if included;
   2> reconfigure the PDCP entity of the sidelink DRB, in accordance with the sl-PDCP-ConfigPC5 received in the RRCReconfigurationSidelink or sl-PDCP-Config received in sl-ConfigDedicatedNR, SIB12, SidelinkPreconfigNR, if included;
   2> reconfigure the RLC entity of the sidelink DRB, in accordance with the sl-RLC-ConfigPC5 received in the RRCReconfigurationSidelink or sl-RLC-Config received in sl-ConfigDedicatedNR, SIB12, SidelinkPreconfigNR, if included;
   2> reconfigure the logical channel of the sidelink DRB, in accordance with the sl-MAC-LogicalChannelConfigPC5 received in the RRCReconfigurationSidelink or sl-MAC-LogicalChannelConfig received in sl-ConfigDedicatedNR, SIB12, SidelinkPreconfigNR, if included.

[ . . . ]

6.2.2 Message Definitions

[ . . . ]

RRCReconfiguration

The RRCReconfiguration message is the command to modify an RRC connection. It may convey information for measurement configuration, mobility control, radio resource configuration (including RBs, MAC main configuration and physical channel configuration) and AS security configuration.

[ . . . ]

| RRCReconfiguration message |
| --- |
| -- ASN1START<br>-- TAG-RRCRECONFIGURATION-START<br>...<br>RRCReconfiguration-V1610-IEs ::=   SEQUENCE {<br>   otherConfig-v1610   OtherConfig-v1610<br>   OPTIONAL, -- Need M<br>   bap-Config-r16   SetupRelease { BAP-Config-r16 }<br>   OPTIONAL, -- Need M<br>   iab-IP-AddressConfigurationList-r16   IAB-IP-AddressConfigurationList-r16<br>   OPTIONAL, -- Need M<br>   conditionalReconfiguration-r16   Conditional-Reconfiguration-r16<br>   OPTIONAL, -- Need M<br>   daps-SourceRelease-r16   ENUMERATED {true}<br>   OPTIONAL, -- Need N<br>   t316-r16   SetupRelease {T316-r16}<br>   OPTIONAL, -- Need M<br>   needForGapsConfigNR-r16   SetupRelease {NeedForGapsConfigNR-r16}<br>   OPTIONAL, -- Need M<br>   onDemandSIB-Request-r16   SetupRelease { OnDemandSIB-Request-r16 }<br>   OPTIONAL, -- Need M<br>   dedicatedPosSysInfoDelivery-r16   OCTET STRING (CONTAINING PosSystemInformation-r16-IEs)<br>   OPTIONAL, -- Need N<br>   sl-ConfigDedicatedNR-r16   SetupRelease {SL-ConfigDedicatedNR-r16}<br>   OPTIONAL, -- Need M<br>   sl-ConfigDedicatedEUTRA-Info-r16   SetupRelease {SL-ConfigDedicatedEUTRA-Info-r16}<br>   OPTIONAL, -- Need M<br>   targetCellSMTC-SCG-r16   SSB-MTC<br>   OPTIONAL, -- Need S<br>   nonCriticalExtension   SEQUENCE { }<br>   OPTIONAL<br>}<br>...<br>-- TAG-RRCRECONFIGURATION-STOP<br>-- ASN1STOP<br>[...] |

RadioBearerConfig
The IE RadioBearerConfig is used to add, modify and release signalling and/or data radio bearers. Specifically, this IE carries the parameters for PDCP and, if applicable, SDAP entities for the radio bearers.

| RadioBearerConfig information element |
| --- |
| -- ASN1START |
| -- TAG-RADIOBEARERCONFIG-START |
| RadioBearerConfig ::=                SEQUENCE { |
|   srb-ToAddModList                    SRB-ToAddModList |
| OPTIONAL, -- Cond HO-Conn |
|   srb3-ToRelease                      ENUMERATED{true} |
| OPTIONAL, -- Need N |
|   drb-ToAddModList                    DRB-ToAddModList |
| OPTIONAL, -- Cond HO-toNR |
|   drb-ToReleaseList                   DRB-ToReleaseList |
| OPTIONAL, -- Need N |
|   securityConfig                      SecurityConfig |
| OPTIONAL, -- Need M |
|   ... |
| } |
| ... |
| DRB-ToAddModList ::=                 SEQUENCE (SIZE (1..maxDRB)) OF DRB-ToAddMod |
| DRB-ToAddMod ::=                     SEQUENCE { |
|   cnAssociation                       CHOICE { |
|     eps-BearerIdentity                INTEGER (0..15), |
|     sdap-Config                       SDAP-Config |
|   } |
| OPTIONAL, -- Cond DRBSetup |
|   drb-Identity                        DRB-Identity, |
|   reestablishPDCP                     ENUMERATED{true} |
| OPTIONAL, -- Need N |
|   recoverPDCP                         ENUMERATED{true} |
| OPTIONAL, -- Need N |
|   pdcp-Config                         PDCP-Config |
| OPTIONAL, -- Cond PDCP |
|   ..., |
|   [[ |
|   daps-Config-r16                     ENUMERATED{true} |
| OPTIONAL -- Cond DAPS |
|   ]] |
| } |
| DRB-ToReleaseList ::=                SEQUENCE (SIZE (1..maxDRB)) OF DRB-Identity |
| [ . . . ] |
| } |
| -- TAG-RADIOBEARERCONFIG-STOP |
| -- ASN1STOP |
| [...] |

RLC-Config
The IE RLC-Config is used to specify the RLC configuration of SRBs and DRBs.

| RLC-Config information element |
| --- |
| -- ASN1START |
| -- TAG-RLC-CONFIG-START |
| RLC-Config ::=                       CHOICE { |
|   am                                  SEQUENCE { |
|     ul-AM-RLC                         UL-AM-RLC, |
|     dl-AM-RLC                         DL-AM-RLC |
|   }, |
|   um-Bi-Directional                   SEQUENCE { |
|     ul-UM-RLC                         UL-UM-RLC, |
|     dl-UM-RLC                         DL-UM-RLC |
|   }, |
|   um-Uni-Directional-UL               SEQUENCE { |
|     ul-UM-RLC                         UL-UM-RLC |
|   }, |
|   um-Uni-Directional-DL               SEQUENCE { |
|     dl-UM-RLC                         DL-UM-RLC |
|   }, |
| [ . . . ] |
| } |

| RLC-Config information element |  |
| --- | --- |
| UL-AM-RLC ::=<br>    sn-FieldLength<br>OPTIONAL, -- Cond Reestab<br>    t-PollRetransmit<br>    pollPDU<br>    pollByte<br>    maxRetxThreshold<br>} | SEQUENCE {<br>    SN-FieldLengthAM<br><br>    T-PollRetransmit,<br>    PollPDU,<br>    PollByte,<br>    ENUMERATED { t1, t2, t3, t4, t6, t8, t16, t32 } |
| DL-AM-RLC ::=<br>    sn-FieldLength<br>OPTIONAL, -- Cond Reestab<br>    t-Reassembly<br>    t-StatusProhibit<br>} | SEQUENCE {<br>    SN-FieldLengthAM<br><br>    T-Reassembly<br>    T-StatusProhibit |
| UL-UM-RLC ::=<br>    sn-FieldLength<br>OPTIONAL -- Cond Reestab<br>} | SEQUENCE {<br>    SN-FieldLengthUM |
| DL-UM-RLC ::=<br>    sn-FieldLength<br>OPTIONAL, -- Cond Reestab<br>    t-Reassembly<br>} | SEQUENCE {<br>    SN-FieldLengthUM<br><br>    T-Reassembly |
| T-PollRetransmit ::= | ENUMERATED {<br>    ms5, ms10, ms15, ms20, ms25, ms30, ms35,<br>    ms40, ms45, ms50, ms55, ms60, ms65, ms70,<br>    ms75, ms80, ms85, ms90, ms95, ms100, ms105,<br>    ms110, ms115, ms120, ms125, ms130, ms135,<br>    ms140, ms145, ms150, ms155, ms160, ms165,<br>    ms170, ms175, ms180, ms185, ms190, ms195,<br>    ms200, ms205, ms210, ms215, ms220, ms225,<br>    ms230, ms235, ms240, ms245, ms250, ms300,<br>    ms350, ms400, ms450, ms500, ms800, ms1000,<br>    ms2000, ms4000, ms1-v1610, ms2-v1610, ms3-v1610,<br>    ms4-v1610, spare1} |
| PollPDU ::= | ENUMERATED {<br>    p4, p8, p16, p32, p64, p128, p256, p512, p1024, p2048,<br>p4096, p6144, p8192, p12288, p16384, p20480,<br>    p24576, p28672, p32768, p40960, p49152, p57344, p65536,<br>infinity, spare8, spare7, spare6, spare5, spare4,<br>    spare3, spare2, spare1} |
| PollByte ::= | ENUMERATED {<br>    kB1, kB2, kB5, kB8, kB10, kB15, kB25, kB50, kB75,<br>    kB100, kB125, kB250, kB375, kB500, kB750, kB1000,<br>    kB1250, kB1500, kB2000, kB3000, kB4000, kB4500,<br>    kB5000, kB5500, kB6000, kB6500, kB7000, kB7500,<br>    mB8, mB9, mB10, mB11, mB12, mB13, mB14, mB15,<br>    mB16, mB17, mB18, mB20, mB25, mB30, mB40, infinity,<br>    spare20, spare19, spare18, spare17, spare16,<br>    spare15, spare14, spare13, spare12, spare11,<br>    spare10, spare9, spare8, spare7, spare6, spare5,<br>    spare4, spare3, spare2, spare1} |
| T-Reassembly ::= | ENUMERATED {<br>    ms0, ms5, ms10, ms15, ms20, ms25, ms30, ms35,<br>    ms40, ms45, ms50, ms55, ms60, ms65, ms70,<br>    ms75, ms80, ms85, ms90, ms95, ms100, ms110,<br>    ms120, ms130, ms140, ms150, ms160, ms170,<br>    ms180, ms190, ms200, spare1} |
| T-StatusProhibit ::= | ENUMERATED {<br>    ms0, ms5, ms10, ms15, ms20, ms25, ms30, ms35,<br>    ms40, ms45, ms50, ms55, ms60, ms65, ms70,<br>    ms75, ms80, ms85, ms90, ms95, ms100, ms105,<br>    ms110, ms115, ms120, ms125, ms130, ms135,<br>    ms140, ms145, ms150, ms155, ms160, ms165,<br>    ms170, ms175, ms180, ms185, ms190, ms195,<br>    ms200, ms205, ms210, ms215, ms220, ms225,<br>    ms230, ms235, ms240, ms245, ms250, ms300,<br>    ms350, ms400, ms450, ms500, ms800, ms1000,<br>    ms1200, ms1600, ms2000, ms2400, spare2, spare1} |
| SN-FieldLengthUM ::= | ENUMERATED {size6, size12} |
| SN-FieldLengthAM ::= | ENUMERATED {size12, size18} |
| RLC-Config-V1610 ::=<br>    dl-AM-RLC-v1610<br>} | SEQUENCE {<br>    DL-AM-RLC-v1610 |

| RLC-Config information element |  |
| --- | --- |
| DL-AM-RLC-V1610 ::=<br>   t-StatusProhibit-v1610<br>OPTIONAL, -- Need N<br>[ . . . ]<br>}<br>T-StatusProhibit-V1610 ::=<br>spare1}<br>-- TAG-RLC-CONFIG-STOP<br>-- ASN1STOP<br>[...] | SEQUENCE {<br>   T-StatusProhibit-v1610<br><br><br><br><br>ENUMERATED {ms1, ms2, ms3, ms4, spare4, spare3, spare2 |

6.3.5 Sidelink Information Elements
SL-ConfigDedicatedNR
The IE SL-ConfigDedicatedNR specifies the dedicated configuration information for NR sidelink communication.

| SL-ConfigDedicatedNR information element | |
| --- | --- |
| -- ASN1START<br>-- TAG-SL-CONFIGDEDICATEDNR-START<br>SL-ConfigDedicatedNR-r16 ::=<br>  sl-PHY-MAC-RLC-Config-r16<br>OPTIONAL, -- Need M<br>  sl-RadioBearerToReleaselist-r16<br>ConfigIndex-r16 OPTIONAL, -- Need N<br>  sl-RadioBearerToAddModList-r16<br>RadioBearerConfig-r16 OPTIONAL, -- Need N<br>  sl-MeasConfigInfoToReleaseList-r16<br>DestinationIndex-r16 OPTIONAL, -- Need N<br>  sl-MeasConfigInfoToAddModList-r16<br>MeasConfigInfo-r16 OPTIONAL, -- Need N<br>  t400-r16<br>ms1500, ms2000}OPTIONAL, -- Need M<br>  . . .<br>}<br>SL-DestinationIndex-r16::=<br>SL-PHY-MAC-RLC-Config-r16::=<br>  sl-ScheduledConfig-r16<br>OPTIONAL, -- Need M<br>  sl-UE-SelectedConfig-r16<br>OPTIONAL, -- Need M<br>  sl-FreqInfoToReleaseList-r16<br>OPTIONAL, -- Need N<br>  sl-FreqInfoToAddModList-r16<br>r16 OPTIONAL, -- Need N<br>  sl-RLC-BearerToReleaseList-r16<br>BearerConfigIndex-r16 OPTIONAL, -- Need N<br>  sl-RLC-BearerToAddModList-r16<br>BearerConfig-r16 OPTIONAL, -- Need N<br>  sl-MaxNumConsecutiveDTX-r16<br>OPTIONAL, -- Need M<br>  sl-CSI-Acquisition-r16<br>OPTIONAL, -- Need R<br>  sl-CSI-SchedulingRequestId-r16<br>OPTIONAL, -- Need M<br>  sl-SSB-PriorityNR-r16<br>OPTIONAL, -- Need R<br>  networkControlledSyncTx-r16<br>OPTIONAL -- Need M<br>}<br>-- TAG-SL-CONFIGDEDICATEDNR-STOP<br>-- ASN1STOP<br>[...] | <br><br>SEQUENCE {<br>  SL-PHY-MAC-RLC-Config-r16<br><br>  SEQUENCE (SIZE (1..maxNrofSLRB-r16)) OF SLRB-Uu-<br><br>  SEQUENCE (SIZE (1..maxNrofSLRB-r16)) OF SL-<br><br>  SEQUENCE (SIZE (1..maxNrofSL-Dest-r16)) OF SL-<br><br>  SEQUENCE (SIZE (1..maxNrofSL-Dest-r16)) OF SL-<br><br>  ENUMERATED {ms100, ms200, ms300, ms400, ms600, ms1000,<br><br><br><br>INTEGER (0..maxNrofSL-Dest-1-r16)<br>SEQUENCE {<br>  SetupRelease { SL-ScheduledConfig-r16 }<br><br>  SetupRelease { SL-UE-SelectedConfig-r16 }<br><br>  SEQUENCE (SIZE (1..maxNrofFreqSL-r16)) OF SL-Freq-Id-r16<br><br>  SEQUENCE (SIZE (1..maxNrofFreqSL-r16)) OF SL-FreqConfig-<br><br>  SEQUENCE (SIZE (1..maxSL-LCID-r16)) OF SL-RLC-<br><br>  SEQUENCE (SIZE (1..maxSL-LCID-r16)) OF SL-RLC-<br><br>  ENUMERATED {n1, n2, n3, n4, n6, n8, n16, n32}<br><br>  ENUMERATED {enabled}<br><br>  SetupRelease {SchedulingRequestId}<br><br>  INTEGER (1..8)<br><br>  ENUMERATED {on, off} |

SL-RadioBearerConfig
The IE SL-RadioBearerConfig specifies the sidelink DRB configuration information for NR sidelink communication.

SL-RadioBearerConfig Information Element

ASN1START
TAG-SL-RADIOBEARERCONFIG-START

SL-RadioBearerConfig-r16::=SEQUENCE {
  slrb-Uu-ConfigIndex-r16 SLRB-Uu-ConfigIndex-r16,
  sl-SDAP-Config-r16 SL-SDAP-Config-r16
  OPTIONAL, - - Cond SLRBSetup
  sl-PDCP-Config-r16 SL-PDCP-Config-r16
  OPTIONAL, - - Cond SLRBSetup
  sl-TransRange-r16 ENUMERATED {m20, m50, m80, m100, m120, m150, m180, m200, m220, m250, m270, m300, m350, m370, m400, m420, m450, m480, m500, m550, m600, m700,
m1000, spare9, spare8, spare7, spare6,
spare5, spare4, spare3, spare2, spare1}
OPTIONAL, -- Need R
...
}

TAG-SL-RADIOBEARERCONFIG-STOP
ASN1STOP
[ ... ]
SL-RLC-BearerConfig
The IE SL-RLC-BearerConfig specifies the SL RLC bearer configuration information for NR sidelink communication.

| SL-RLC-BearerConfig information element |
| --- |
| -- ASN1START<br>-- TAG-SL-RLC-BEARERCONFIG-START<br>SL-RLC-BearerConfig-r16 ::=    SEQUENCE {<br>    sl-RLC-BearerConfigIndex-r16    SL-RLC-BearerConfigIndex-r16,<br>    sl-ServedRadioBearer-r16    SLRB-Uu-ConfigIndex-r16<br>OPTIONAL, -- Cond LCH-SetupOnly<br>    sl-RLC-Config-r16    SL-RLC-Config-r16<br>OPTIONAL, -- Cond LCH-Setup<br>    sl-MAC-LogicalChannelConfig-r16    SL-LogicalChannelConfig-r16<br>OPTIONAL, -- Cond LCH-Setup<br>...<br>}<br>-- TAG-SL-RLC-BEARERCONFIG-STOP<br>-- ASN1STOP<br>[...] |

6.6.2 Message Definitions
[ ... ]
RRCReconfigurationSidelink
The RRCReconfigurationSidelink message is the command to AS configuration of the PC5 RRC connection. It is only applied to unicast of NR sidelink communication.

| RRCReconfigurationSidelink message |
| --- |
| -- ASN1START<br>-- TAG-RRCRECONFIGURATIONSIDELINK-START<br>RRCReconfigurationSidelink ::=    SEQUENCE {<br>    rrc-TransactionIdentifier-r16    RRC-TransactionIdentifier<br>    criticalExtensions    CHOICE {<br>        rrcReconfigurationSidelink-r16    RRCReconfigurationSidelink-IEs-r16,<br>        criticalExtensionsFuture    SEQUENCE { }<br>    }<br>}<br>RRCReconfigurationSidelink-IEs-r16 ::=    SEQUENCE {<br>    slrb-ConfigToAddModList-r16    SEQUENCE (SIZE (1..maxNrofSLRB-r16)) OF SLRB-Config-r16<br>OPTIONAL, -- Need N<br>    slrb-ConfigToReleaseList-r16    SEQUENCE (SIZE (1..maxNrofSLRB-r16)) OF SLRB-PC5-ConfigIndex-r16 OPTIONAL, -- Need N<br>    sl-MeasConfig-r16    SetupRelease {SL-MeasConfig-r16}<br>OPTIONAL, -- Need M<br>    sl-CSI-RS-Config-r16    SetupRelease {SL-CSI-RS-Config-r16}<br>OPTIONAL, -- Need M<br>    sl-ResetConfig-r16    ENUMERATED {true}<br>OPTIONAL, -- Need N<br>    sl-LatencyBoundCSI-Report-r16    INTEGER (3..160)<br>OPTIONAL, -- Need M<br>    lateNonCriticalExtension    OCTET STRING<br>OPTIONAL,<br>    nonCriticalExtension    SEQUENCE { }<br>OPTIONAL<br>}<br>SLRB-Config-r16::=    SEQUENCE {<br>    slrb-PC5-ConfigIndex-r16    SLRB-PC5-ConfigIndex-r16,<br>    sl-SDAP-ConfigPC5-r16    SL-SDAP-ConfigPC5-r16<br>OPTIONAL, -- Need M<br>    sl-PDCP-ConfigPC5-r16    SL-PDCP-ConfigPC5-r16<br>OPTIONAL, -- Need M<br>    sl-RLC-ConfigPC5-r16    SL-RLC-ConfigPC5-r16<br>OPTIONAL, -- Need M<br>    sl-MAC-LogicalChannelConfigPC5-r16    SL-LogicalChannelConfigPC5-r16<br>OPTIONAL, -- Need M<br>...<br>} |

-continued

| RRCReconfigurationSidelink message |
| --- |

```
SLRB-PC5-ConfigIndex-r16 ::=           INTEGER (1..maxNrofSLRB-r16)
SL-SDAP-ConfigPC5-r16 ::=              SEQUENCE {
    sl-MappedQoS-FlowsToAddList-r16        SEQUENCE (SIZE (1..maxNrofSL-QFIsPerDest-r16)) OF
SL-PQFI-r16 OPTIONAL, -- Need N
    sl-MappedQoS-FlowsToReleaseList-r16    SEQUENCE (SIZE (1..maxNrofSL-QFIsPerDest-r16)) OF
SL-PQFI-r16 OPTIONAL, -- Need N
    sl-SDAP-Header-r16                     ENUMERATED {present, absent},
    ...
}
SL-PDCP-ConfigPC5-r16 ::=              SEQUENCE {
    sl-PDCP-SN-Size-r16                    ENUMERATED {len12bits, len18bits}
OPTIONAL, -- Need M
    sl-OutOfOrderDelivery-r16              ENUMERATED { true }
OPTIONAL, -- Need R
    ...
}
SL-RLC-ConfigPC5-r16 ::=               CHOICE {
    sl-AM-RLC-r16                          SEQUENCE {
        sl-SN-FieldLengthAM-r16                SN-FieldLengthAM
OPTIONAL, -- Need M
        ...
    },
    sl-UM-Bi-Directional-RLC-r16           SEQUENCE {
        sl-SN-FieldLengthUM-r16                SN-FieldLengthUM
OPTIONAL, -- Need M
        ...
    },
    sl-UM-Uni-Directional-RLC-r16          SEQUENCE {
        sl-SN-FieldLengthUM-r16                SN-FieldLengthUM
OPTIONAL, -- Need M
        ...
    }
}
SL-LogicalChannelConfigPC5-r16 ::=     SEQUENCE {
    sl-LogicalChannelIdentity-r16          Logical-ChannelIdentity,
    ...
}
SL-PQFI-r16 ::=                        INTEGER (1..64)
SL-CSI-RS-Config-r16 ::=               SEQUENCE {
    sl-CSI-RS-FreqAllocation-r16           CHOICE {
        sl-OneAntennaPort-r16                  BIT STRING (SIZE (12)),
        sl-TwoAntennaPort-r16                  BIT STRING (SIZE (6))
    }
OPTIONAL, -- Need M
    sl-CSI-RS-FirstSymbol-r16              INTEGER (3..12)
OPTIONAL, -- Need M
    ...
}
-- TAG-RRCRECONFIGURATIONSIDELINK-STOP
-- ASN1STOP
```

3GPP R2-2108924 specifies protocol architecture and sidelink relay related procedures for Layer-2 UE-to-Network Relay as follows:

16.x Sidelink Relay 16.x.1 General

Sidelink relay is introduced to support 5G ProSe UE-to-Network Relay (U2N Relay) function (specified in TS 23.304 [xx]) to provide connectivity to the network for U2N Remote UE(s). Both L2 and L3 U2N Relay architecture are supported.

A U2N Relay UE shall be in RRC_CONNECTED to perform relaying of unicast data.

For L2 U2N relay operation, the following RRC state combinations are supported:
  Both U2N Relay and U2N Remote UE shall be in RRC CONNECTED to perform transmission/reception of relayed unicast data.
  The U2N Relay UE can be in RRC_IDLE, RRC_INACTIVE or RRC_CONNECTED as long as all the PC5-connected U2N Remote UE(s) are either in RRC_INACTIVE or in RRC_IDLE.

For L2 U2N relay, the U2N Remote UE can be configured to use resource allocation mode 2 if relay connection has been setup.

Editor's Note: For L2 U2N Remote UE, it is FFS on whether CG type 1 resource allocation can be used if relay connection has been setup.

16.x.2 Protocol Architecture 16.x.2.1 L2 UE-to-Network Relay

Figure 16:
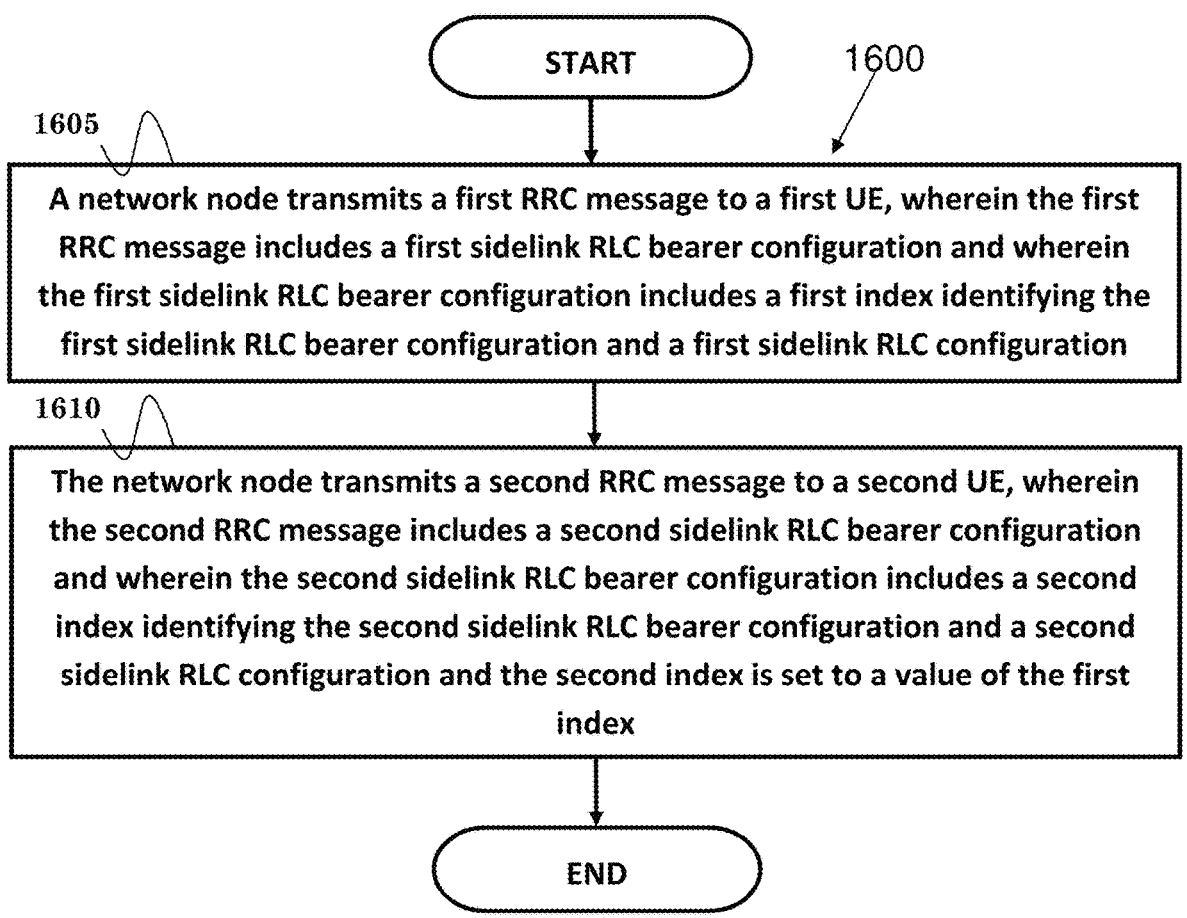
FIG. 16 is a flow chart according to one exemplary embodiment.

The protocol stacks for the user plane and control plane of L2 U2N Relay architecture are described in FIG. 16.x.2.1-1 and FIG. 16.x.2.1-2. For L2 U2N Relay, the adaptation layer is placed over RLC sublayer for both CP and UP at both PC5 interface and Uu interface. The Uu SDAP/PDCP and RRC are terminated between U2N Remote UE and gNB, while RLC, MAC and PHY are terminated in each link (i.e. the link between U2N Remote UE and U2N Relay UE and the link between U2N Relay UE and the gNB).

Figure 8:
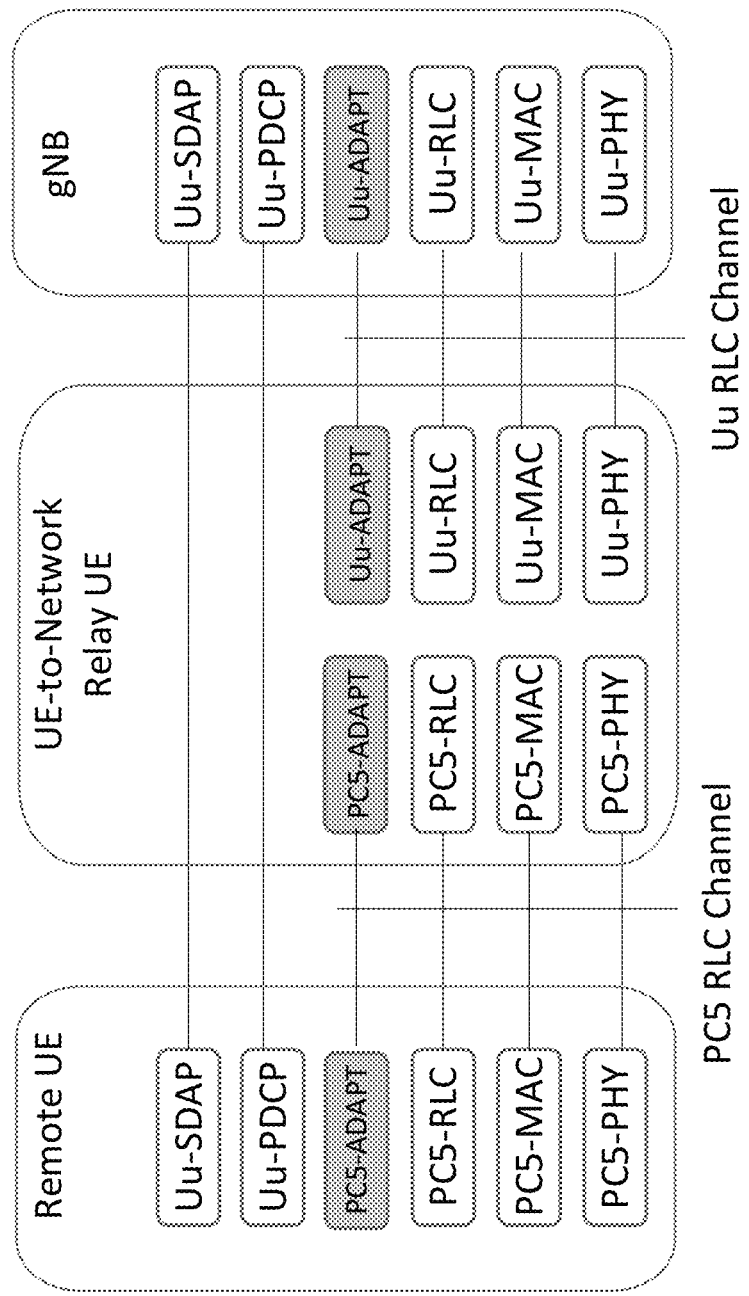
FIG. 8 is a reproduction of FIG. 16.x.2.1-1 of 3GPP R2-2108924.

[FIG. 16.x.2.1-1 of 3GPP R2-2108924, entitled "User plane protocol stack for L2 UE-to-Network Relay", is reproduced as FIG. 8]

Figure 9:
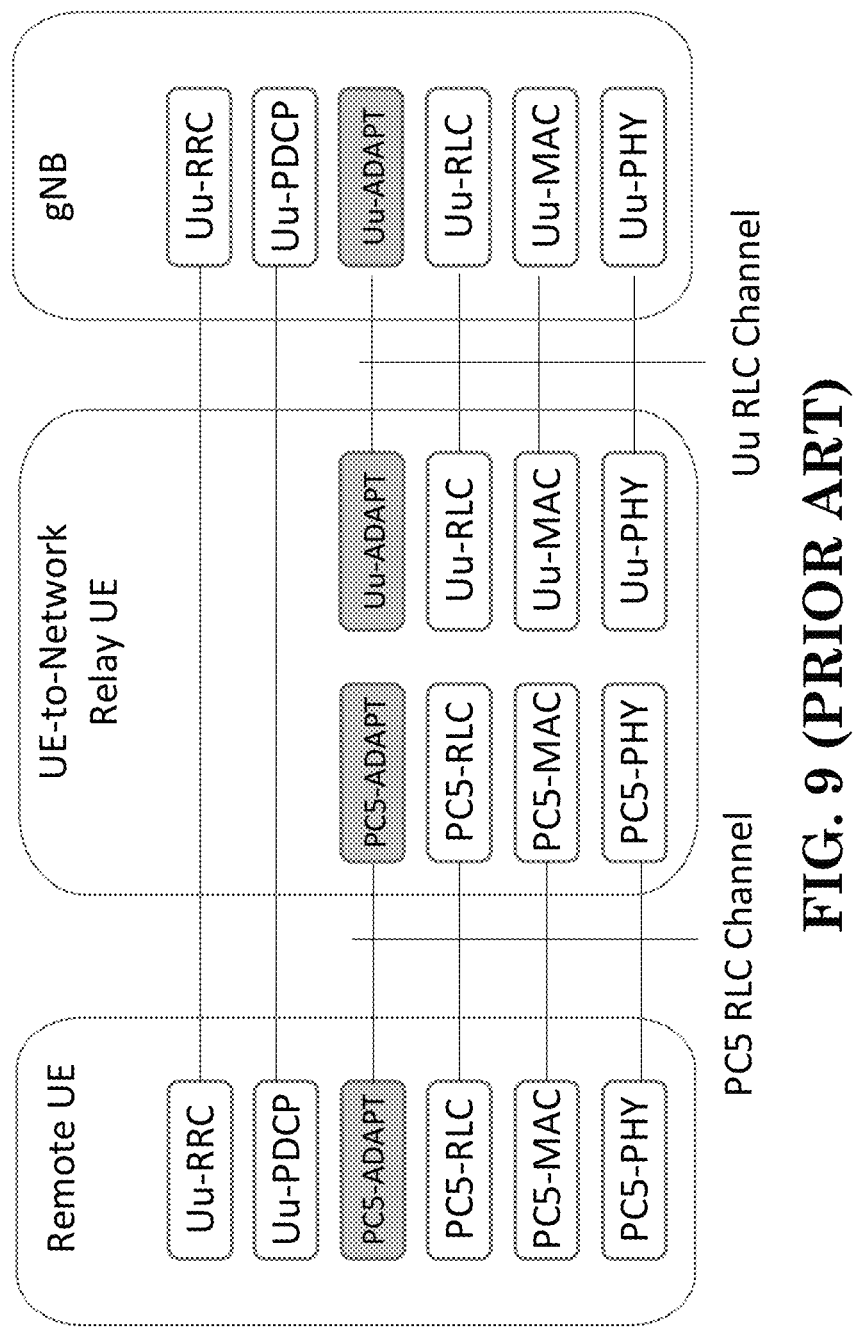
FIG. 9 is a reproduction of FIG. 16.x.2.1-2 of 3GPP R2-2108924.

[FIG. 16.x.2.1-2 of 3GPP R2-2108924, entitled "Control plane protocol stack for L2 UE-to-Network Relay", is reproduced as FIG. 9]

Editor's Note: The name of PC5 adapation layer and Uu adapation layer are not decided yet, and then currently PC5-ADAPT and Uu-ADAPT are used.

For L2 U2N Relay, for uplink

The Uu adaptation layer supports UL bearer mapping between ingress PC5 RLC channels for relaying and egress Uu RLC channels over the Relay UE Uu interface. For uplink relaying traffic, the different end-to-end RBs (SRB, DRB) of the same Remote UE and/or different Remote UEs can be subject to N:1 mapping and data multiplexing over one Uu RLC channel.

The Uu adaptation layer supports Remote UE identification for the UL traffic (multiplexing the data coming from multiple Remote UE). The identity information of Remote UE Uu Radio Bearer and a local Remote UE ID is included in the Uu adaptation layer at UL in order for gNB to correlate the received packets for the specific PDCP entity associated with the right Remote UE Uu Radio Bearer of a Remote UE.

For L2 U2N Relay, for downlink

The Uu adaptation layer supports DL bearer mapping at gNB to map end-to-end Radio Bearer (SRB, DRB) of Remote UE into Uu RLC channel over Relay UE Uu interface. The Uu adaptation layer can be used to support DL N:1 bearer mapping and data multiplexing between multiple end-to-end Radio Bearers (SRBs, DRBs) of a Remote UE and/or different Remote UEs and one Uu RLC channel over the Relay UE Uu interface.

The Uu adaptation layer supports Remote UE identification for Downlink traffic. The identity information of Remote UE Uu Radio Bearer and a local Remote UE ID needs be put into the Uu adaptation layer by gNB at DL in order for Relay UE to map the received packets from Remote UE Uu Radio Bearer to its associated PC5 RLC channel.

For L2 U2N Relay, the adaptation layer over PC5 is only for the purpose of bearer mapping.

Adaptation layer is not present over PC5 hop for relaying the U2N Remote UE's message on BCCH and PCCH.

For U2N Remote UE's message on SRB0, the Adaptation layer is not present over PC5 hop, but the adaptation layer is present over Uu hop for both DL and UL.

[ . . . ]

16.x.5 Control Plane Procedures for L2 U2N Relay

Editor's Note: describe the high level control plane procedures including connection management, system information, paging, access control etc.

16.x.5.1 RRC Connection Management

Editor's Note: Need to describe the connection establishment and reestablishment aspects in this subsection.

The U2N Remote UE needs to establish its own PDU sessions/DRBs with the network before user plane data transmission.

The legacy NR V2X PC5 unicast link establishment procedures can be reused to setup a secure unicast link between U2N Remote UE and U2N Relay UE before Remote UE establishes a Uu RRC connection with the network via Relay UE.

The establishment of Uu SRB1/SRB2 and DRB of the U2N Remote UE is subject to Uu configuration procedures for L2 UE-to-Network Relay.

Figure 10:
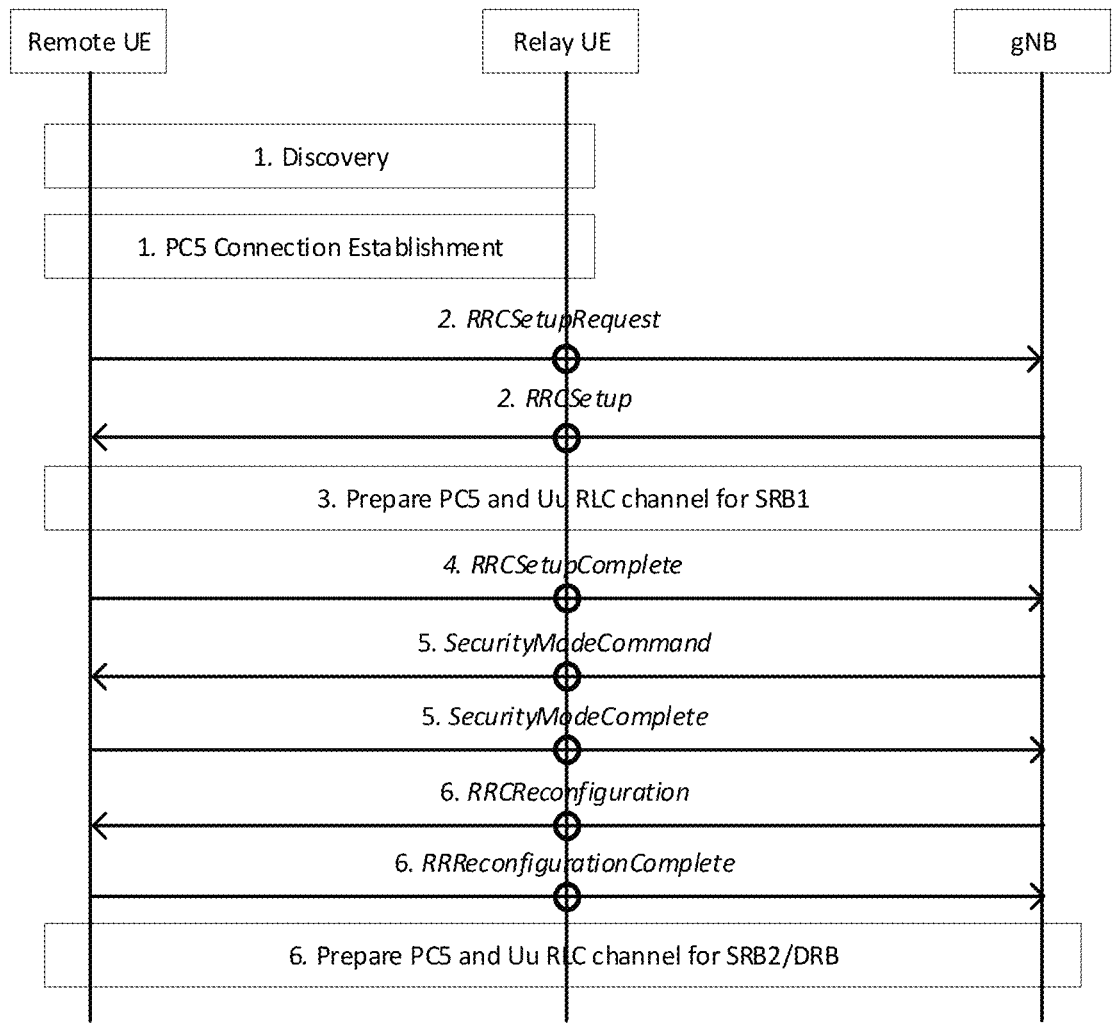
FIG. 10 is a reproduction of FIG. 16.x.5.1-1 of 3GPP R2-2108924.

The following high level connection establishment procedure in FIG. 16.x.5.1-1 applies to L2 U2N Relay:

[FIG. 16.x.5.1-1 of 3GPP R2-2108924, entitled "Procedure for remote UE connection establishment", is reproduced as FIG. 10]

1. The U2N Remote and U2N Relay UE perform discovery procedure, and establish PC5-RRC connection using NR V2X procedure.

2. The U2N Remote UE sends the first RRC message (i.e., RRCSetupRequest) for its connection establishment with gNB via the Relay UE, using a specified PC5 RLC bearer configuration on PC5. If the U2N Relay UE had not started in RRC_CONNECTED, it would need to do its own connection establishment as part of this step. The gNB responds with an RRCSetup message to U2N Remote UE. The RRCSetup delivery to the U2N Remote UE uses a specified PC5 RLC bearer configuration.

3. The gNB and U2N Relay UE perform relaying channel setup procedure over Uu. According to the configuration from gNB, the U2N Relay/Remote UE establishes an RLC channel for relaying of SRB1 towards the U2N Remote UE over PC5.

4. The RRCSetupComplete message is sent by the U2N Remote UE is sent to the gNB via the U2N Relay UE using SRB1 relaying channel over PC5 and SRB1 relaying channel configured to the U2N Relay UE over Uu. Then the U2N Remote UE is RRC connected over Uu.

5. The U2N Remote UE and gNB establish security following Uu procedure and the security messages are forwarded through the U2N Relay UE.

6. The gNB sends an RRCReconfiguration message to the U2N Remote UE via the U2N Relay UE, to setup the SRB2/DRBs for relaying purpose. The U2N Remote UE sends an RRCReconfigurationComplete message to the gNB via the U2N Relay UE as a response. In addition, the gNB setups additional RLC channels between the gNB and U2N Relay UE for the relay traffic. The U2N Remote UE in RRC_CONNECTED suspends Uu RLM when U2N Remote UE is connected to gNB via U2N Relay UE. Upon detecting Uu RLF, an indication from U2N Relay UE may trigger connection re-establishment for U2N Remote UE. Upon detecting PC5 RLF, the U2N Remote UE may trigger connection re-establishment.

The U2N Remote UE may perform the following actions during the RRC re-establishment procedure:

If only suitable cell(s) are available, the U2N Remote UE initiates RRC re-establishment procedure towards a suitable cell;

If only suitable U2N Relay UE(s) are available, the U2N Remote UE initiates RRC re-establishment procedure towards a suitable relay UE's serving cell;

If both a suitable cell and a suitable relay are available, the remote UE can select either one to initiate RRC re-establishment procedure based on implementation.

In case the U2N Remote UE initiates RRC resume to a new gNB, the legacy Retrieve UE Context procedure is performed, i.e., the new gNB retrieves the Remote UE context for U2N Remote UE.

The U2N Remote UE performs RNAU procedure while in RRC_INACTIVE. For U2N Remote UE in coverage, it performs RNAU based on its own serving cell information if it is not PC5-connected with a U2N Relay UE.

[ . . . ]

16.x.6 Service Continuity for L2 U2N Relay

Figure 11:
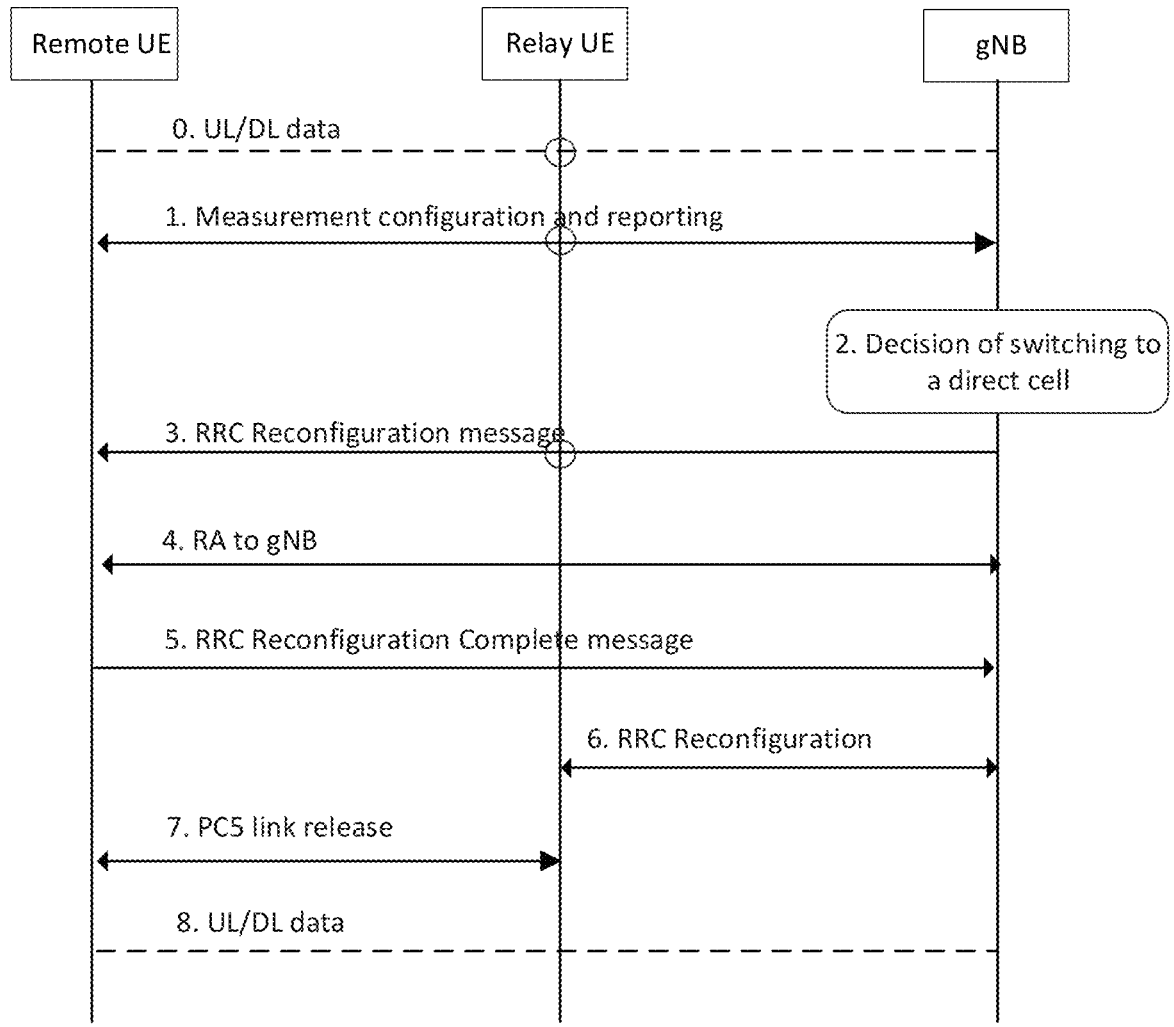
FIG. 11 is a reproduction of FIG. 16.x.6.1-1 of 3GPP R2-2108924.

Editor's Note: This section describes the high level procedures of service continuity for L2 U2N relay 16.x.6.1 Switching from Indirect to Direct Path For service continuity of L2 U2N relay, the following procedure is used, in case of U2N Remote UE switching to direct Uu cell:

[FIG. 16.x.6.1-1 of 3GPP R2-2108924, entitled "Procedure for U2N Remote UE switching to direct Uu cell", is reproduced as FIG. 11]

1. The Uu measurement configuration and measurement report signalling procedures is performed to evaluate both relay link measurement and Uu link measurement. The measurement results from U2N Remote UE are reported when configured reporting criteria is met. The SL relay measurement report shall include at least U2N Relay UE ID, serving cell ID, and SL-RSRP information.
2. The gNB decides to switch the Remote UE onto direct Uu path.
3. The gNB sends RRCReconfiguration message to the U2N Remote UE. The U2N Remote UE stops UP and CP transmission via U2N Relay UE after reception of RRCReconfiguration message from the gNB.
4. The U2N Remote UE synchronizes with the gNB and performs Random Access.
5. The UE (i.e. previous U2N Remote UE) sends the RRCReconfigurationComplete to the gNB via target path, using the configuration provided in the RRCReconfiguration message. From this step, the U2N Remote UE moves the RRC connection to the gNB
6. The gNB sends RRCReconfiguration message to the U2N Relay UE to reconfigure the connection between the U2N Relay UE and the gNB. The RRCReconfiguration message to the U2N Relay UE can be sent any time after step 3 based on gNB implementation (e.g. to release Uu and PC5 RLC configuration for relaying, and bearer mapping configuration between PC5 RLC and Uu RLC).
7. Either U2N Relay UE or U2N Remote UE can initiate the PC5 unicast link release (PC5-S). The timing to execute link release is up to UE implementation. The U2N Relay UE can execute PC5 connection reconfiguration to release PC5 RLC for relaying upon reception of RRC Reconfiguration by gNB in Step 6, or the UE (i.e. previous U2N Remote UE) can execute PC5 connection reconfiguration to release PC5 RLC for relaying upon reception of RRC Reconfiguration by gNB in Step 3.
8. The data path is switched from indirect path to direct path between the UE (i.e. previous U2N Remote UE) and the gNB. Step 8 can be executed in parallel or after step 5, which is independent of step 6 and step 7. The DL/UL lossless delivery during the path switch is done according to PDCP data recovery procedure.

16.x.6.2 Switching from Direct to Indirect Path

Figure 12:
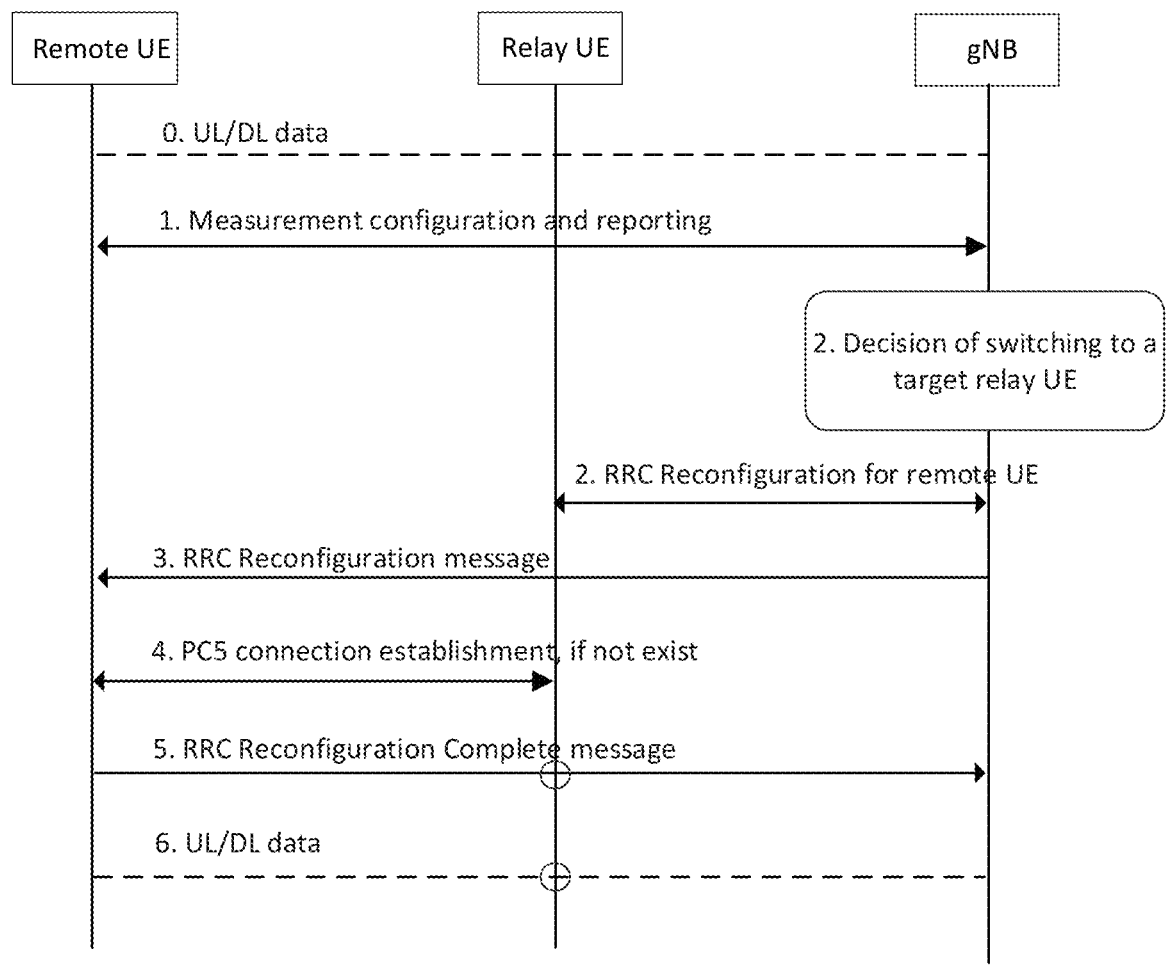
FIG. 12 is a reproduction of FIG. 16.x.6.2-1 of 3GPP R2-2108924.

For service continuity of L2 U2N Relay, the following procedure is used, in case of a UE switching to U2N Relay UE:

[FIG. 16.x.6.2-1 of 3GPP R2-2108924, entitled "Procedure for U2N Remote UE switching to indirect Relay UE", is reproduced as FIG. 12]

1. The U2N Remote UE reports one or multiple candidate U2N Relay UE(s) and legacy Uu measurements, after it measures/discovers the candidate U2N Relay UE(s).
   The UE may filter the appropriate U2N Relay UE(s) according to Relay selection criteria before reporting.
   The UE shall report only the U2N Relay UE candidate(s) that fulfil the higher layer criteria.
   The reporting can include at least U2N Relay UE ID, U2N Relay UE's serving cell ID, and SD-RSRP information.
2. The gNB decides to switch the U2N Remote UE to a target U2N Relay UE. Then the gNB sends an RRCReconfiguration message to the target U2N Relay UE, which can include at least Uu and PC5 RLC configuration for relaying, and bearer mapping configuration.

Editor's Note: At step 2, the gNB may decide to perform a normal handover rather than a path switch to an indirect path.
3. The gNB sends the RRCReconfiguration message to the U2N Remote UE. The contents in the RRCReconfiguration message can include at least U2N Relay UE ID, PC5 RLC configuration for relay traffic and the associated end-to-end radio bearer(s). The U2N Remote UE stops UP and CP transmission over Uu after reception of RRCReconfiguration message from the gNB.
4. The U2N Remote UE establishes PC5 connection with target U2N Relay UE
5. The U2N Remote UE completes the path switch procedure by sending the RRCReconfigurationComplete message to the gNB via the Relay UE.
6. The data path is switched from direct path to indirect path between the U2N Remote UE and the gNB.

Editor's Note: FFS in case the target relay UE is in IDLE/INACTIVE, if supported.

The 3GPP Draft_38.331 Running CR introduces Rel-17 Sidelink Relay on top of 3GPP TS 38.331 according to agreements of RAN2 #115e meeting as follows:

5.3.5 RRC Reconfiguration

-----------text omitted-----------------------------------

5.3.5.5.4 RLC Bearer Addition/Modification

For each RLC-BearerConfig received in the rlc-BearerToAddModList IE the UE shall:

1> if the UE's current configuration contains an RLC bearer with the received logicalChannelIdentity within the same cell group:
   2> if the RLC bearer is associated with an DAPS bearer, or
   2> if any DAPS bearer is configured and the RLC bearer is associated with an SRB:
      3> reconfigure the RLC entity or entities for the target cell group in accordance with the received rlc-Config;
      3> reconfigure the logical channel for the target cell group in accordance with the received mac-LogicalChannelConfig;
   2> else:
      3> if reestablishRLC is received:
         4> re-establish the RLC entity as specified in TS 38.322 [4];
      3> reconfigure the RLC entity or entities in accordance with the received rlc-Config;
      3> reconfigure the logical channel in accordance with the received mac-LogicalChannelConfig;
   NOTE 1: The network does not re-associate an already configured logical channel with another radio bearer. Hence servedRadioBearer is not present in this case.
   NOTE 2: In DAPS handover, the UE may perform RLC entity re-establishment (if reestablishRLC is set) for an RLC bearer associated with a non-DAPS bearer when indication of successful completion of random access towards target cell is received from lower layers as specified in TS 38.321 [3].
1> else (a logical channel with the given logicalChannelIdentity is not configured within the same cell group, including the case when full configuration option is used):
   2> if the servedRadioBearer associates the logical channel with an SRB and rlc-Config is not included:

3> establish an RLC entity in accordance with the default configuration defined in 9.2 for the corresponding SRB;
2> else:
3> establish an RLC entity in accordance with the received rlc-Config;
2> if the servedRadioBearer associates the logical channel with an SRB and if mac-LogicalChannelConfig is not included:
3> configure this MAC entity with a logical channel in accordance to the default configuration defined in 9.2 for the corresponding SRB;
2> else:
3> configure this MAC entity with a logical channel in accordance to the received mac-LogicalChannelConfig;
2> associate this logical channel with the PDCP entity identified by servedRadioBearer.

Editor's note: RAN2 to further discuss if the legacy Uu RLC bearer add/mod/release signalling and procedure can be reused for Relay UE's Uu RLC bearer configuration. FFS on the terminology of Relay UE's Uu RLC bearer and the PC5 RLC bearer between Remote UE and Relay UE.

Next Modified Subclause 5.3.5.14 Sidelink Dedicated Configuration
Upon initiating the procedure, the UE shall:
1> if sl-FreqInfoToReleaseList is included in sl-ConfigDedicatedNR within RRCReconfiguration:
2> for each entry included in the received sl-FreqInfoToReleaseList that is part of the current UE configuration:
3> release the related configurations from the stored NR sidelink communication configurations;
1> if sl-FreqInfoToAddModList is included in sl-ConfigDedicatedNR within RRCReconfiguration:
2> if configured to receive NR sidelink communication:
3> use the resource pool(s) indicated by sl-RxPool for NR sidelink communication reception, as specified in 5.8.7;
2> if configured to transmit NR sidelink communication:
3> use the resource pool(s) indicated by sl-TxPoolSelectedNormal, sl-TxPoolScheduling or sl-TxPoolExceptional for NR sidelink communication transmission, as specified in 5.8.8;
2> if configured to receive NR sidelink discovery:
3> use the resource pool(s) indicated by sl-DiscRxPool or sl-RxPool for NR sidelink discovery reception, as specified in 5.8.x1.2;
2> if configured to transmit NR sidelink discovery:
3> use the resource pool(s) indicated by sl-DiscTxPoolSelected, sl-DiscTxPoolSchedulinq, sl-TxPoolSelectedNormal, sl-TxPoolSchedulinq or sl-TxPoolExceptional for NR sidelink discovery transmission, as specified in 5.8.x1.3;
2> perform CBR measurement on the transmission resource pool(s) indicated by sl-TxPoolSelectedNormal, sl-TxPoolScheduling, sl-DiscTxPoolSelected, sl-DiscTxPoolSchedulinq or sl-TxPoolExceptional for NR sidelink communication transmission, as specified in 5.5.3;
2> use the synchronization configuration parameters for NR sidelink communication on frequencies included in sl-FreqInfoToAddModList, as specified in 5.8.5;
1> if sl-RodioBearerToReleaseList or sl-RLC-BearerToReleaseList is included in sl-ConfigDedicatedNR within RRCReconfiguration:
2> perform sidelink DRB release as specified in 5.8.9.1a.1;
2> perform sidelink RLC bearer release for the RLC bearer without SL-PDCP as specified in 5.8.9.x1.1;
1> if sl-RadioBearerToAddModList or sl-RLC-BearerToAddModList is included in sl-ConfigDedicatedNR within RRCReconfiguration:
2> perform sidelink DRB addition/modification as specified in 5.8.9.1a.2;
2> perform sidelink RLC bearer addition/modification for the RLC bearer without SL-PDCP as specified in 5.8.9.x1.2;
1> if sl-ScheduledConfig is included in sl-ConfigDedicatedNR within RRCReconfiguration:
2> configure the MAC entity parameters, which are to be used for NR sidelink communication, in accordance with the received sl-ScheduledConfig;
1> if sl-UE-SelectedConfig is included in sl-ConfigDedicatedNR within RRCReconfiguration:
2> configure the parameters, which are to be used for NR sidelink communication, in accordance with the received sl-UE-SelectedConfig;
1> if sl-MeasConfigInfoToReleaseList is included in sl-ConfigDedicatedNR within RRCReconfiguration:
2> for each SL-DestinationIndex included in the received sl-MeasConfigInfoToReleaseList that is part of the current UE configuration:
3> remove the entry with the matching SL-DestinationIndex from the stored NR sidelink measurement configuration information;
1> if sl-MeasConfigInfoToAddModList is included in sl-ConfigDedicatedNR within RRCReconfiguration:
2> for each sl-DestinationIndex included in the received sl-MeasConfigInfoToAddModList that is part of the current stored NR sidelink measurement configuration:
3> reconfigure the entry according to the value received for this sl-DestinationIndex from the stored NR sidelink measurement configuration information;
2> for each sl-DestinationIndex included in the received sl-MeasConfigInfoToAddModList that is not part of the current stored NR sidelink measurement configuration:
3> add a new entry for this sl-DestinationIndex to the stored NR sidelink measurement configuration.

Figure 13:
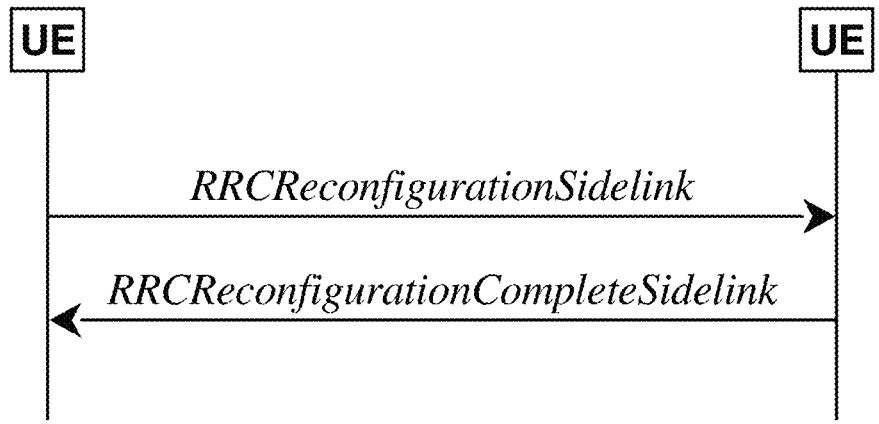
FIG. 13 is a reproduction of FIG. 5.8.9.1.1-1 of the 3GPP Draft_38.331 Running CR for SL relay_v13_rapp.
Figure 14:
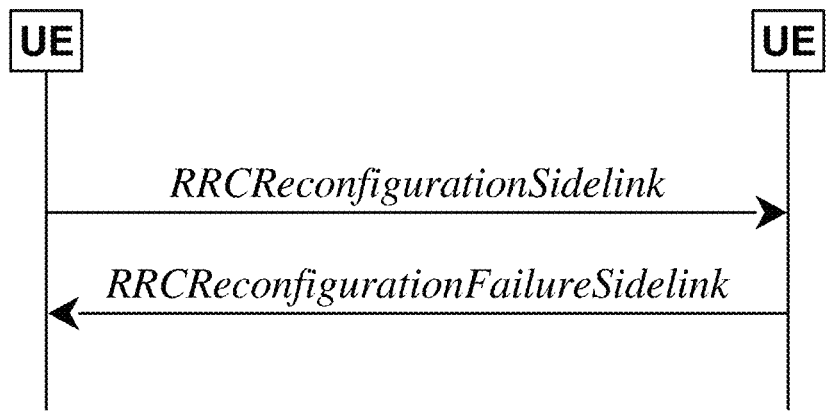
FIG. 14 is a reproduction of FIG. 5.8.9.1.1-2 of the 3GPP Draft_38.331 Running CR for SL relay_v13_rapp.

Next Modified Subclause 5.8.9 Sidelink RRC Procedure
5.8.9.1 Sidelink RRC Reconfiguration
5.8.9.1.1 General
[FIG. 5.8.9.1.1-1 of the 3GPP Draft_38.331 Running CR for SL relay_v13_rapp, entitled "Sidelink RRC reconfiguration, successful", is reproduced as FIG. 13]
[FIG. 5.8.9.1.1-2 of the 3GPP Draft_38.331 Running CR for SL relay_v13_rapp, entitled "Sidelink RRC reconfiguration, failure", is reproduced as FIG. 14]
The purpose of this procedure is to modify a PC5-RRC connection, e.g. to establish/modify/release sidelink DRBs, to (re-)configure NR sidelink measurement and reporting, to (re-)configure sidelink CSI reference signal resources and CSI reporting latency bound.

The UE may initiate the sidelink RRC reconfiguration procedure and perform the operation in sub-clause 5.8.9.1.2 on the corresponding PC5-RRC connection in following cases:

- the release of sidelink DRBs associated with the peer UE, as specified in sub-clause 5.8.9.1a.1;
- the establishment of sidelink DRBs associated with the peer UE, as specified in sub-clause 5.8.9.1a.2;
- the modification for the parameters included in SLRB-Config of sidelink DRBs associated with the peer UE, as specified in sub-clause 5.8.9.1a.2;
- the release of sidelink RLC bearers not associated with SL-PDCP for L2 U2N Relay UE and Remote UE, as specified in sub-clause 5.8.9.x1.1;
- the establishment of RLC bearers not associated with SL-PDCP for L2 U2N Relay UE and Remote UE, as specified in sub-clause 5.8.9.x1.2;
- the modification for the parameters included in SL-RLC-BearerConfiq of RLC bearers not associated with SL-PDCP for L2 U2N Relay UE and Remote UE, as specified in sub-clause 5.8.9.x1.2;
- the (re-)configuration of the peer UE to perform NR sidelink measurement and report.
- the (re-)configuration of the sidelink CSI reference signal resources and CSI reporting latency bound.

In RRC_CONNECTED, the UE applies the NR sidelink communications parameters provided in RRCReconfiguration (if any). In RRC_IDLE or RRC_INACTIVE, the UE applies the NR sidelink communications parameters provided in system information (if any). For other cases, UEs apply the NR sidelink communications parameters provided in SidelinkPreconfigNR (if any). When UE performs state transition between above three cases, the UE applies the NR sidelink communications parameters provided in the new state, after acquisition of the new configurations. Before acquisition of the new configurations, UE continues applying the NR sidelink communications parameters provided in the old state.

Next Modified Subclause 5.8.9.x1 Sidelink RLC Bearer Management for L2 U2N Relay 5.8.9.x1.1 Sidelink RLC Bearer Release The UE shall:
  1> for each sl-RLC-BearerConfigIndex included in the received sl-RLC-BearerToReleaseList that is part of the current UE sidelink configuration:
    2> release the RLC entity and the corresponding logical channel for NR sidelink communication, associated with the sl-RLC-BearerConfigIndex;

5.8.9.x1.2 Sidelink RLC bearer addition/modification

For each sl-RLC-BearerConfigIndex received in the sl-RLC-BearerToAddModList IE the UE shall:
  1> if the current configuration contains a sidelink RLC bearer with the received sl-RLC-BearerConfigIndex:
    2> reconfigure the sidelink RLC entity or entities in accordance with the received sl-RLC-ConfigPC5;
    2> reconfigure the sidelink logical channel in accordance with the received sl-MAC-LogicalChannelConfigPC5;
  1> else (a sidelink RLC bearer with the received sl-RLC-BearerConfigIndex was not configured before):
    2> establish an sidelink RLC entity in accordance with the received sl-RLC-ConfigPC5;
    2> configure the sidelink MAC entity with a logical channel in accordance with the received sl-MAC-LogicalChannelConfigPC5.

[ . . . ]

RRCReconfiguration

The RRCReconfiguration message is the command to modify an RRC connection. It may convey information for measurement configuration, mobility control, radio resource configuration (including RBs, MAC main configuration and physical channel configuration) and AS security configuration.

Signalling radio bearer: SRB1 or SRB3
RLC-SAP: AM
Logical channel: DCCH
Direction: Network to UE

| RRCReconfiguration message |
|---|
| ```
-- ASN1START
-- TAG-RRCRECONFIGURATION-START
RRCReconfiguration ::=                    SEQUENCE {
    rrc-TransactionIdentifier                 RRC-TransactionIdentifier,
    criticalExtensions                        CHOICE {
        rrcReconfiguration                        RRCReconfiguration-IEs,
        criticalExtensionsFuture                  SEQUENCE {}
    }
}
RRCReconfiguration-IEs ::=                SEQUENCE {
    radioBearerConfig                         RadioBearerConfig
                                                  OPTIONAL, -- Need M
    secondaryCellGroup                        OCTET STRING (CONTAINING CellGroupConfig)
                                                  OPTIONAL, -- Cond SCG
    measConfig                                MeasConfig
                                                  OPTIONAL, -- Need M
    lateNonCriticalExtension                  OCTET STRING
                                                  OPTIONAL,
    nonCriticalExtension                      RRCReconfiguration-V1530-IEs
                                                  OPTIONAL
}
RRCReconfiguration-V1530-IEs ::=          SEQUENCE {
    masterCellGroup                           OCTET STRING (CONTAINING CellGroupConfig)
                                                  OPTIONAL, -- Need M
``` |

| RRCReconfiguration message | |
|---|---|
| fullConfig<br>OPTIONAL, -- Cond FullConfig | ENUMERATED {true} |
| dedicatedNAS-MessageList<br>OPTIONAL, -- Cond nonHO | SEQUENCE (SIZE(1..maxDRB)) OF DedicatedNAS-Message |
| masterKeyUpdate<br>OPTIONAL, -- Cond MasterKeyChange | MasterKeyUpdate |
| dedicatedSIB1-Delivery<br>OPTIONAL, -- Need N | OCTET STRING (CONTAINING SIB1) |
| dedicatedSystemInformationDelivery<br>OPTIONAL, -- Need N | OCTET STRING (CONTAINING SystemInformation) |
| otherConfig<br>OPTIONAL, -- Need M | OtherConfig |
| nonCriticalExtension<br>OPTIONAL<br>} | RRCReconfiguration-V1540-IEs |
| RRCReconfiguration-V1540-IEs ::=<br>otherConfig-V1540<br>OPTIONAL, -- Need M | SEQUENCE {<br>OtherConfig-V1540 |
| nonCriticalExtension<br>OPTIONAL<br>} | RRCReconfiguration-v1560-IEs |
| RRCReconfiguration-V1560-IEs ::=<br>mrdc-SecondaryCellGroupConfig<br>OPTIONAL, -- Need M | SEQUENCE {<br>SetupRelease { MRDC-SecondaryCellGroupConfig } |
| radioBearerConfig2<br>OPTIONAL, -- Need M | OCTET STRING (CONTAINING RadioBearerConfig) |
| sk-Counter<br>OPTIONAL, -- Need N | SK-Counter |
| nonCriticalExtension<br>OPTIONAL<br>} | RRCReconfiguration-v1610-IEs |
| RRCReconfiguration-v1610-IEs ::=<br>otherConfig-v1610<br>OPTIONAL, -- Need M | SEQUENCE {<br>OtherConfig-v1610 |
| bap-Config-r16<br>OPTIONAL, -- Need M | SetupRelease { BAP-Config-r16 } |
| iab-IP-AddressConfigurationList-r16<br>OPTIONAL, -- Need M | IAB-IP-AddressConfigurationList-r16 |
| conditionalReconfiguration-r16<br>OPTIONAL, -- Need M | ConditionalReconfiguration-r16 |
| daps-SourceRelease-r16<br>OPTIONAL, -- Need N | ENUMERATED {true} |
| t316-r16<br>OPTIONAL, -- Need M | SetupRelease {T316-r16} |
| needForGapsConfigNR-r16<br>OPTIONAL, -- Need M | SetupRelease {NeedForGapsConfigNR-r16} |
| onDemandSIB- Request-r16<br>OPTIONAL, -- Need M | SetupRelease { OnDemandSIB-Request-r16 } |
| dedicatedPosSysInfoDelivery-r16<br>OPTIONAL, -- Need N | OCTET STRING (CONTAINING PosSystemInformation-r16-IEs) |
| sl-ConfigDedicatedNR-r16<br>OPTIONAL, -- Need M | SetupRelease {SL-ConfigDedicatedNR-r16} |
| sl-ConfigDedicatedEUTRA-Info-r16<br>OPTIONAL, -- Need M | SetupRelease {SL-ConfigDedicatedEUTRA-Info-r16} |
| targetCellSMTC-SCG-r16<br>OPTIONAL, -- Need S | SSB-MTC |
| nonCriticalExtension<br>OPTIONAL<br>} | RRCReconfiguration-v17xx-IEs |
| RRCReconfiguration-v17xx-IEs ::=<br>pathSwitchConfig-r17<br>OPTIONAL, -- RemoteUE | SEQUENCE {<br>PathSwitchConfig-r17 |
| nonCriticalExtension<br>OPTIONAL<br>} | SEQUENCE { } |
| MRDC-SecondaryCellGroupConfig ::=<br>mrdc-ReleaseAndAdd<br>OPTIONAL, -- Need N | SEQUENCE {<br>ENUMERATED {true} |
| mrdc-SecondaryCellGroup<br>  nr-SCG<br>  eutra-SCG<br>}<br>} | CHOICE {<br>  OCTET STRING (CONTAINING RRCReconfiguration),<br>  OCTET STRING |

| RRCReconfiguration message |
|---|

```
BAP-Config-r16 ::=                      SEQUENCE {
    bap-Address-r16                         BIT STRING (SIZE (10))
OPTIONAL, -- Need M
    defaultUL-BAP-RoutingID-r16             BAP-RoutingID-r16
OPTIONAL, -- Need M
    defaultUL-BH-RLC-Channel-r16            BH-RLC-ChannelID-r16
OPTIONAL, -- Need M
    flowControlFeedbackType-r16             ENUMERATED {perBH-RLC-Channel, perRoutingID, both}
OPTIONAL, -- Need R
    . . .
}
MasterKeyUpdate ::=                     SEQUENCE {
    keySetChangeIndicator                   BOOLEAN,
    nextHopChainingCount                    NextHopChainingCount,
    nas-Container                           OCTET STRING
OPTIONAL, -- Cond securityNASC
    . . .
}
OnDemandSIB-Request-r16 ::=             SEQUENCE {
    onDemandSIB-RequestProhibitTimer-r16    ENUMERATED {s0, s0dot5, s1, s2, s5, s10, s20, s30}
}
T316-r16 ::= ENUMERATED {ms50, ms100, ms200, ms300, ms400, ms500, ms600, ms1000, ms1500,
ms2000}
IAB-IP-AddressConfigurationList-r16 ::= SEQUENCE {
    iab-IP-AddressToAddModList-r16          SEQUENCE (SIZE(1..maxIAB-IP-Address-r16)) OF IAB-IP-
AddressConfiguration-r16 OPTIONAL, -- Need N
    iab-IP-AddressToReleaseList-r16         SEQUENCE (SIZE(1..maxIAB-IP-Address-r16)) OF IAB-IP-
AddressIndex-r16 OPTIONAL, -- Need N
    . . .
}
IAB-IP-AddressConfiguration-r16 ::=     SEQUENCE {
    iab-IP-AddressIndex-r16                 IAB-IP-AddressIndex-r16,
    iab-IP-Address-r16                      IAB-IP-Address-r16
OPTIONAL, -- Need M
    iab-IP-Usage-r16                        IAB-IP-Usage-r16
OPTIONAL, -- Need M
    iab-donor-DU-BAP-Address-r16            BIT STRING (SIZE(10))
OPTIONAL, -- Need M
    . . .
}
SL-ConfigDedicatedEUTRA-Info-r16 ::=    SEQUENCE {
    sl-ConfigDedicatedEUTRA-r16                 OCTET STRING
OPTIONAL, -- Need M
    sl-TimeOffsetEUTRA-List-r16                 SEQUENCE (SIZE (8)) OF SL-TimeOffsetEUTRA-r16
OPTIONAL -- Need M
}
SL-TimeOffsetEUTRA-r16 ::=              ENUMERATED {ms0, ms0dot25, ms0dot5, ms0dot625, ms0dot75, ms1,
ms1dot25, ms1dot5, ms1dot75,
                                            ms2, ms2dot5, ms3, ms4, ms5, ms6, ms8, ms10, ms20}
PathSwitchConfig-r17 ::=                SEQUENCE {
    relayUE-Identity-r17                        FFS,
    pCell-Identity-r17                          FFS,
    newUE-IdentityRemote-r17                    RNTI-Value,
    . . .
}
-- TAG-RRCRECONFIGURATION-STOP
-- ASN1STOP
```

Editor's Note: RAN2 to further discuss if the reconfigurationWithSync can be reused for path switch from direct link to indirect link.

The UE-to-Network relay is supported in NR Release 17 to enable coverage extension and power saving for the remote UE. In other words, a UE-to-Network relay UE may be used to support communication between a remote UE and the network in case the remote UE cannot access the network directly or the communication path between the remote UE and the network is poor. There are two different types of solutions for UE-to-Network relay, including a Layer-2 (based) UE-to-Network relay and a Layer-3 (based) UE-to-Network relay.

Both Model A discovery and Model B discovery may be supported for the remote UE to discover a UE-to-Network Relay. Model A uses a single discovery protocol message (i.e. UE-to-Network Relay Discovery Announcement) and Model B uses two discovery protocol messages (i.e. UE-to-Network Relay Discovery Solicitation and UE-to-Network Relay Discovery Response). The UE-to-Network Relay Discovery Announcement message/UE-to-Network Relay Discovery Response message transmitted by a relay UE may include an Announcer Info/Discoveree Info (i.e. User Info ID) of the relay UE and a Relay Service Code (RSC) associated with the connectivity service for which the UE-to-Network Relay provides traffic relaying service to the Remote UE.

A 5G ProSe UE-to-Network Relay supporting multiple RSCs can advertise the RSCs using multiple discovery messages, with one RSC per discovery message. The UE-to- Network Relay Discovery Solicitation message transmitted by the remote UE may include a Discoverer Info (i.e. User Info ID) of the remote UE and the Relay Service Code (RSC) associated with the connectivity service. The User Info ID of the relay UE/remote UE and the RSC may be preconfigured to the relay UE/remote UE for each connectivity service. Besides, both relay UE and remote UE may also be preconfigured with a UE-to-Network Relay Layer Indicator used to indicate whether a particular RSC is offering 5G ProSe Layer-2 or Layer-3 UE-to-Network Relay service.

In case there are multiple relay UEs in proximity of the remote UE, one of the relay UEs would be selected. After selecting a suitable relay UE, the remote UE may then establish a PC5 unicast link (or PC5 RRC connection) with the relay UE to support UE-to-Network Relay operation. The remote UE may transmit a Direct Communication Request message to the relay UE and the Direct Communication Request message may include a User Info ID (or Source User Info) of the remote UE, a User Info ID (or Target User Info) of the relay UE, and the RSC of the concerned connectivity service. The relay UE may then reply a Direct Communication Accept message to the relay UE and the Direct Communication Accept message may include the User Info ID (or Source User Info) of the relay UE. It is noted that in a PC5 unicast link establishment procedure applied for a ProSe direct communication (i.e. no UE-to-Network relay is involved), a ProSe Service Info (or ProSe identifier) instead of a RSC is included in the Direct Communication Request message.

To access the concerned connectivity service from a data network (DN), a PDU session should be established with the DN using a Single Network Slice Selection Assistance Information (S-NSSAI) and a Data Network Name (DNN) associated with the Protocol Data Unit (PDU) session. In the Layer-2 UE-to-Network Relay solution, the remote UE establishes a PDU session with the DN via the relay UE, while the relay UE establishes the PDU session with the DN for the remote UE in the Layer-3 UE-to-Network Relay solution.

3GPP R2-2108924 specifies path switching from direct to indirect path for Layer-2 UE-to-Network (U2N) Relay. Basically, a remote UE needs to perform measurements and report the measurement results to gNB when it directly connects with the gNB for accessing connectivity services via PDU sessions established between the remote UE and the network. The measurement report may include candidate UE-to-Network Relay UEs for gNB to determine the target relay UE(s) for path switching when necessary (e.g. when the signal quality of direct path is getting poor). If the gNB decides to switch the Remote UE to a target U2N Relay UE, the gNB sends an RRCReconfiguration message to the target U2N Relay UE, which may include at least Uu and PC5 RLC configuration for relaying, and bearer mapping configuration. The gNB also sends another RRCReconfiguration message to the U2N Remote UE. The contents in the RRCReconfiguration message may include at least U2N Relay UE Identity (ID), PC5 Radio Link Control (RLC) configuration for relay traffic and the associated end-to-end radio bearer(s).

In NR Rel-16 V2X, a UE in RRC_CONNECTED shall transmit a SIdelinkUEInformationNR message to gNB for requesting transmission resource for NR sidelink communication with the peer UE. In response, gNB will reply a RRCReconfiguration message to the UE, which may include a sidelink radio bearer configuration and a sidelink RLC bearer configuration used for sidelink transmission from the UE to the peer UE. The UE may then transmits a RRCReconfigurationSidelink message to the peer UE to provide the sidelink radio bearer configuration and the sidelink RLC bearer configuration. Similarly, the peer UE may get another sidelink radio bearer configuration and another sidelink RLC bearer configuration, used for sidelink transmission from the peer UE to the UE, from its serving gNB and provides them to the UE via another RRCReconfigurationSidelink message. Each sidelink RLC bearer configuration may include a sidelink RLC configuration and a logical channel configuration. And, the sidelink RLC configuration may include RLC parameters used for sidelink transmission from one UE to the other UE.

In Section 5.8.9.1 (Sidelink RRC reconfiguration) of the 3GPP Draft_38.331 Running CR for SL relay_v13_rapp, the following new bullets are added to support Layer 2 U2N relaying operations:

the release of sidelink RLC bearers not associated with SL-PDCP for L2 U2N Relay UE and Remote UE, as specified in sub-clause 5.8.9.x1.1;

the establishment of RLC bearers not associated with SL-PDCP for L2 U2N Relay UE and Remote UE, as specified in sub-clause 5.8.9.x1.2;

the modification for the parameters included in SL-RLC-BearerConfig of RLC bearers not associated with SL-PDCP for L2 U2N Relay UE and Remote UE, as specified in sub-clause 5.8.9.x1.2;

Adding these new bullets in Section 5.8.9.1 of the 3GPP Draft_38.331 Running CR for SL relay_v13_rapp implies a similar mechanism for sidelink RLC bearer establishment in NR Rel-16 V2X will be reused to support Layer 2 U2N relaying operations. In other words, a remote UE/relay UE would get the sidelink RLC bearer configuration from gNB and provide it to the relay UE/remote UE. In case of Layer 2 U2N relaying, both the remote UE and the relay UE could be served by the same gNB.

In NR Rel-16 V2X, one RLC entity is created to support both transmission and reception for a bi-directional sidelink radio bearer. Thus, the sidelink RLC configuration obtained from its serving gNB and the other sidelink RLC configuration obtained from the peer UE should be associated with each other to form RLC parameters of an RLC entity. Basically, one RLC entity is used to support transmissions and receptions for the same PC5 (sidelink) QoS flows. Therefore, both sidelink RLC configurations obtained from gNB and the peer UE could be associated with each other according to the supported PC5 (sidelink) Quality of Service (QoS) flows indicated by a SL-SDAP-Config received from the gNB and by an SL-SDAP-ConfigPC5 received from the peer UE. However, since there is no SL-SDAP-ConfigPC5 exchanged between remote UE and relay UE in the RRCReconfigurationSidelink messages for supporting Layer 2 U2N relaying operations, another way to associate both sidelink RLC configurations (or sidelink RLC bearer configurations) obtained from gNB and the peer UE should be considered.

One potential solution is for gNB to include one sidelink RLC bearer configuration and information used for associating the other sidelink RLC bearer configuration with the sidelink RLC bearer configuration. In one embodiment, the information may indicate the associated sidelink RLC bearer configuration. For example, the information may be an index of the associated sidelink RLC bearer configuration or an identity of the associated logical channel. An index of a sidelink RLC bearer configuration is used to identify the sidelink RLC bearer configuration. The information may be transmitted in a RRCReconfiguration message. It is also feasible to associate both sidelink RLC bearer configurations obtained from gNB and the peer UE by using the same sidelink RLC bearer configuration index for both configurations. In this situation, both configurations are associated with each other by the same sidelink RLC bearer configuration index and thus no explicit information needs to be included in the RRCReconfiguration message sent to the remote UE or relay UE.

Alternatively, another potential solution is for gNB to provide both sidelink RLC bearer configurations to the remote UE and the relay UE directly in a RRCReconfiguration message. Or, gNB may provide one sidelink RLC bearer configuration which includes a sidelink RLC configuration for both transmission and reception. In other words, the sidelink RLC configuration includes RLC parameters for both transmission and reception. In this situation, no RRCReconfigurationSidelink message needs to be exchanged between the remote UE and the relay UE.

In one embodiment, the RRCReconfiguration message transmitted to the remote UE may also include a radio bearer configuration (or a configuration of a radio bearer) and the RRCReconfiguration message or the radio bearer configuration may include an identity of the radio bearer. The radio bearer configuration may also include a SDAP configuration and/or a PDCP configuration. The radio bearer could be served by the sidelink RLC bearer(s) or an RLC entity established according to the sidelink RLC bearer configuration(s). The RRCReconfiguration message transmitted to the relay UE may also include two (Uu) RLC bearer configurations—one for transmission and the other for reception. It is also feasible for the RRCReconfiguration message to include one (Uu) RLC bearer configuration which contains RLC parameters for both transmission and reception. A (Uu) RLC bearer configuration may include a (Uu) RLC configuration and a logical channel configuration and an SL RLC bearer configuration may include an SL RLC configuration and an SL logical channel configuration. In response to reception of the RRC Reconfiguration message, the relay UE/remote UE may transmit a RRC Reconfiguration Complete message to the gNB. It is possible that another RRC message may be used to replace the RRC Reconfiguration message/RRC Reconfiguration Complete message.

The above solutions may also be applicable to the case where the Remote UE connects with the gNB via the Relay UE.

Figure 15:
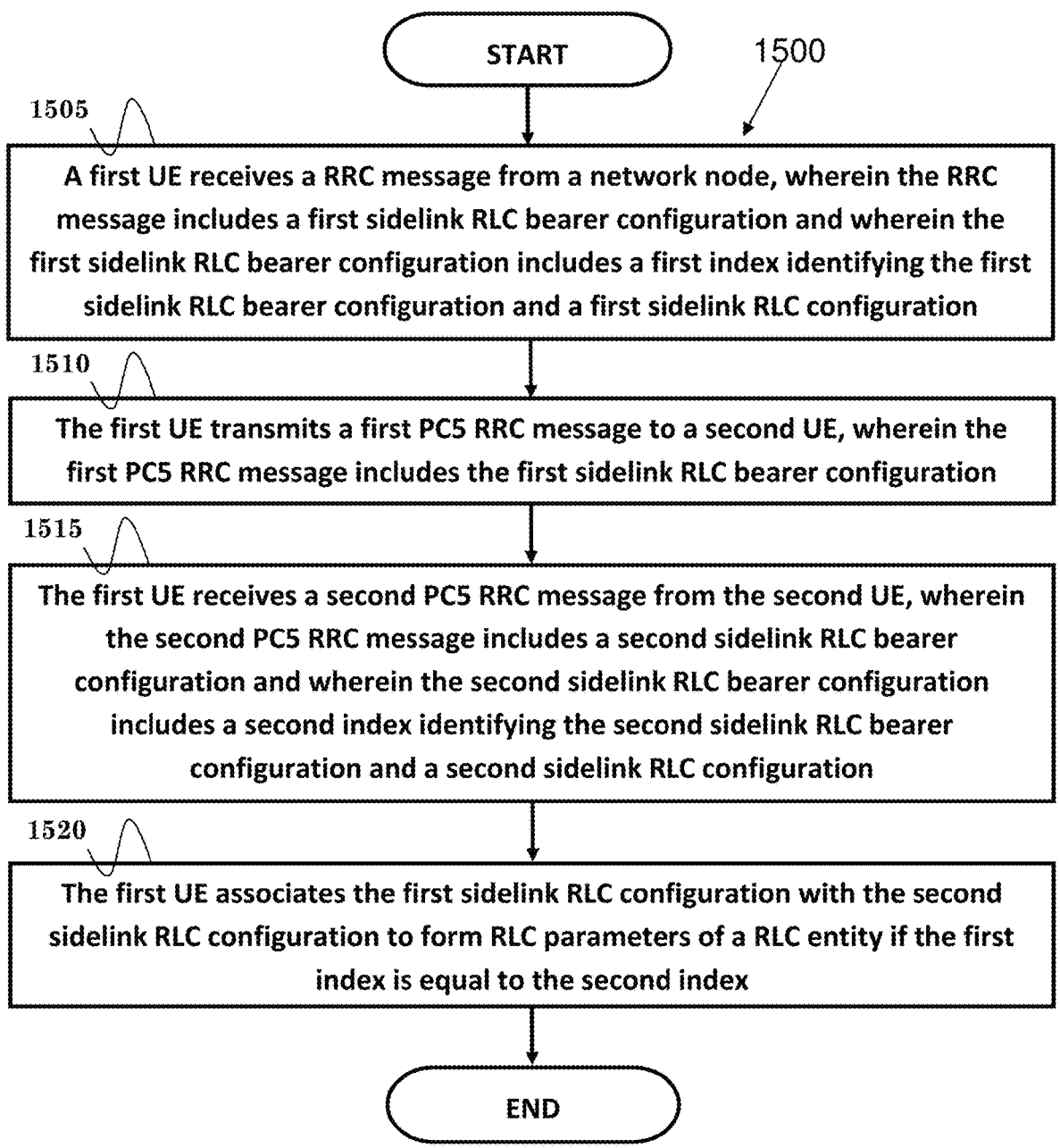
FIG. 15 is a flow chart according to one exemplary embodiment.

FIG. 15 is a flow chart 1500 of a method for a sidelink Radio Link Control (RLC) entity establishment from the perspective of a first UE. In step 1505, a first UE receives a Radio Resource Control (RRC) message from a network node, wherein the RRC message includes a first sidelink RLC bearer configuration and wherein the first sidelink RLC bearer configuration includes a first index identifying the first sidelink RLC bearer configuration and a first sidelink RLC configuration. In step 1510, the first UE transmits a first PC5 RRC message to a second UE, wherein the first PC5 RRC message includes the first sidelink RLC bearer configuration. In step 1515, the first UE receives a second PC5 RRC message from the second UE, wherein the second PC5 RRC message includes a second sidelink RLC bearer configuration and wherein the second sidelink RLC bearer configuration includes a second index identifying the second sidelink RLC bearer configuration and a second sidelink RLC configuration. In step 1520, the first UE associates the first sidelink RLC configuration with the second sidelink RLC configuration to form RLC parameters of a RLC entity if the first index is equal to the second index.

In one embodiment, the first UE could establish the RLC entity for transmission to and reception from the second UE. The first UE could be a Layer-2 UE-to-Network Remote UE and the second UE could be a Layer-2 UE-to-Network Relay UE, or the first UE could be a Layer-2 UE-to-Network Relay UE and the second UE could be a Layer-2 UE-to-Network Remote UE. The Layer-2 UE-to-Network Remote UE could communicate with the network via the Layer-2 UE-to-Network Relay UE.

In one embodiment, the RRC message may include a (Uu) RLC bearer configuration that may include a (Uu) RLC configuration which may contain RLC parameters for transmission and reception if the UE is a Layer-2 UE-to-Network Relay UE. The first UE could assign an identity of a logical channel corresponding to the RLC entity and includes the identity in the first PC5 RRC message.

In one embodiment, an adaptation layer could be placed over a RLC sublayer in the first UE and the second UE for mapping end-to-end data radio bearer(s) to logical (or RLC) channel(s). The RRC message may be a RRC Reconfiguration message. The first PC5 RRC message may be a RRC Reconfiguration Sidelink message. The second PC5 RRC message may be a RRC Reconfiguration Sidelink message.

In one embodiment, both the first UE and the second UE could be served by the network node.

Referring back to FIGS. 3 and 4, in one exemplary embodiment of a first UE, the first UE 300 includes a program code 312 stored in the memory 310. The CPU 308 could execute program code 312 to enable the first UE (i) to receive a RRC message from a network node, wherein the RRC message includes a first sidelink RLC bearer configuration and wherein the first sidelink RLC bearer configuration includes a first index identifying the first sidelink RLC bearer configuration and a first sidelink RLC configuration, (ii) to transmit a first PC5 RRC message to a second UE, wherein the first PC5 RRC message includes the first sidelink RLC bearer configuration, (iii) to receive a second PC5 RRC message from the second UE, wherein the second PC5 RRC message includes a second sidelink RLC bearer configuration and wherein the second sidelink RLC bearer configuration includes a second index identifying the second sidelink RLC bearer configuration and a second sidelink RLC configuration, and (iv) to associate the first sidelink RLC configuration with the second sidelink RLC configuration to form RLC parameters of a RLC entity if the first index is equal to the second index. Furthermore, the CPU 308 can execute the program code 312 to perform all of the above-described actions and steps or others described herein.

FIG. 16 is a flow chart 1600 of a method for sidelink RLC bearer configuration from the perspective of a network node. In step 1605, a network node transmits a first RRC message to a first UE, wherein the first RRC message includes a first sidelink RLC bearer configuration and wherein the first sidelink RLC bearer configuration includes a first index identifying the first sidelink RLC bearer configuration and a first sidelink RLC configuration. In step 1610, the network node transmits a second RRC message to a second UE, wherein the second RRC message includes a second sidelink RLC bearer configuration and wherein the second sidelink RLC bearer configuration includes a second index identifying the second sidelink RLC bearer configuration and a second sidelink RLC configuration and the second index is set to a value of the first index.

In one embodiment, the first UE may be a Layer-2 UE-to-Network Remote UE and the second UE may be a Layer-2 UE-to-Network Relay UE, or the first UE may be a Layer-2 UE-to-Network Relay UE and the second UE may be a Layer-2 UE-to-Network Remote UE. The network node could communicate with the Layer-2 UE-to-Network Remote UE via the Layer-2 UE-to-Network Relay UE.

In one embodiment, the RRC message could include a (Uu) RLC bearer configuration including a (Uu) RLC configuration which contains RLC parameters for transmission and reception if the UE is a Layer-2 UE-to-Network Relay UE. The network node could establish a RLC entity for transmission to and reception from the Layer-2 UE-to-Network Relay UE according to the (Uu) RLC configuration.

In one embodiment, an adaptation layer could be placed over a RLC sublayer in the network node for mapping end-to-end data radio bearer(s) to logical (or RLC) channel(s). The first RRC message may be a RRC Reconfiguration message. The second RRC message may be a RRC Reconfiguration message.

Referring back to FIGS. 3 and 4, in one exemplary embodiment of a network node, the network node 300 includes a program code 312 stored in the memory 310. The CPU 308 could execute program code 312 to enable the network node (i) to transmit a first RRC message to a first UE, wherein the first RRC message includes a first sidelink RLC bearer configuration and wherein the first sidelink RLC bearer configuration includes a first index identifying the first sidelink RLC bearer configuration and a first sidelink RLC configuration, and (ii) to transmit a second RRC message to a second UE, wherein the second RRC message includes a second sidelink RLC bearer configuration and wherein the second sidelink RLC bearer configuration includes a second index identifying the second sidelink RLC bearer configuration and a second sidelink RLC configuration and the second index is set to a value of the first index. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage

The invention claimed is:

1. A method for sidelink Radio Link Control (RLC) entity establishment, comprising:
   a first User Equipment (UE) receives a Radio Resource Control (RRC) message from a network node, wherein the RRC message includes a first sidelink RLC bearer configuration and wherein the first sidelink RLC bearer configuration includes a first index identifying the first sidelink RLC bearer configuration and a first sidelink RLC configuration;
   the first UE transmits a first PC5 RRC message to a second UE, wherein the first PC5 RRC message includes the first sidelink RLC bearer configuration;
   the first UE receives a second PC5 RRC message from the second UE, wherein the second PC5 RRC message includes a second sidelink RLC bearer configuration and wherein the second sidelink RLC bearer configuration includes a second index identifying the second sidelink RLC bearer configuration and a second sidelink RLC configuration; and
   the first UE associates the first sidelink RLC configuration with the second sidelink RLC configuration to form RLC parameters of a RLC entity when the first index is equal to the second index.

2. The method of claim 1, further comprising:
   the first UE establishes the RLC entity for transmission to and reception from the second UE.

3. The method of claim 1, wherein the first UE is a Layer-2 UE-to-Network Remote UE and the second UE is a Layer-2 UE-to-Network Relay UE, or the first UE is a Layer-2 UE-to-Network Relay UE and the second UE is a Layer-2 UE-to-Network Remote UE.

4. The method of claim 3, wherein the Layer-2 UE-to-Network Remote UE communicates with the network via the Layer-2 UE-to-Network Relay UE.

5. The method of claim 1, wherein the RRC message includes a RLC bearer configuration that includes a RLC configuration which contains RLC parameters for transmission and reception when the UE is a Layer-2 UE-to-Network Relay UE.

6. The method of claim 1, further comprising:
   the first UE assigns an identity of a logical channel corresponding to the RLC entity and includes the identity in the first PC5 RRC message.

7. The method of claim 1, wherein an adaptation layer is placed over a RLC sublayer in the first UE and the second UE for mapping end-to-end data radio bearers to logical channels.

8. The method of claim 1, wherein the RRC message is a RRC Reconfiguration message.

9. The method of claim 1, wherein the first PC5 RRC message is a RRC Reconfiguration Sidelink message.

10. The method of claim 1, wherein the second PC5 RRC message is a RRC Reconfiguration Sidelink message.

11. The method of claim 1, wherein both the first UE and the second UE are served by the network node.

12. A first UE (User Equipment), comprising:
    a control circuit;
    a processor installed in the control circuit; and
    a memory installed in the control circuit and operatively coupled to the processor;
    wherein the processor is configured to execute a program code stored in the memory to:
      receive a Radio Resource Control (RRC) message from a network node, wherein the RRC message includes a first sidelink (Radio Link Control) RLC bearer configuration and wherein the first sidelink RLC bearer configuration includes a first index identifying the first sidelink RLC bearer configuration and a first sidelink RLC configuration;
      transmit a first PC5 RRC message to a second UE, wherein the first PC5 RRC message includes the first sidelink RLC bearer configuration;
      receive a second PC5 RRC message from the second UE, wherein the second PC5 RRC message includes a second sidelink RLC bearer configuration and wherein the second sidelink RLC bearer configuration includes a second index identifying the second sidelink RLC bearer configuration and a second sidelink RLC configuration; and
      associate the first sidelink RLC configuration with the second sidelink RLC configuration to form RLC parameters of a RLC entity when the first index is equal to the second index.

13. A method for sidelink Radio Link Control (RLC) bearer configuration, comprising:
    a network node transmits a first Radio Resource Control (RRC) message to a first User Equipment (UE), wherein the first RRC message includes a first sidelink RLC bearer configuration and wherein the first sidelink RLC bearer configuration includes a first index identifying the first sidelink RLC bearer configuration and a first sidelink RLC configuration; and
    the network node transmits a second RRC message to a second UE, wherein the second RRC message includes a second sidelink RLC bearer configuration and wherein the second sidelink RLC bearer configuration includes a second index identifying the second sidelink RLC bearer configuration and a second sidelink RLC configuration and the second index is set to a value of the first index.

14. The method of claim 13, wherein the first UE is a Layer-2 UE-to-Network Remote UE and the second UE is a Layer-2 UE-to-Network Relay UE, or the first UE is a Layer-2 UE-to-Network Relay UE and the second UE is a Layer-2 UE-to-Network Remote UE.

15. The method of claim 14, wherein the network node communicates with the Layer-2 UE-to-Network Remote UE via the Layer-2 UE-to-Network Relay UE.

16. The method of claim 13, wherein the RRC message includes a RLC bearer configuration including a RLC configuration which contains RLC parameters for transmission and reception when the UE is a Layer-2 UE-to-Network Relay UE.

17. The method of claim 16, further comprising:
the network node establishes a RLC entity for transmission to and reception from the Layer-2 UE-to-Network Relay UE according to the RLC configuration.

18. The method of claim 13, wherein an adaptation layer is placed over a RLC sublayer in the network node for mapping end-to-end data radio bearers to logical channels.

19. The method of claim 13, wherein the first RRC message is a RRC Reconfiguration message.

20. The method of claim 13, wherein the second RRC message is a RRC Reconfiguration message.

* * * * *